(12) United States Patent
Lofy et al.

(10) Patent No.: US 10,196,079 B2
(45) Date of Patent: Feb. 5, 2019

(54) TEMPERATURE CONTROL DEVICE FOR A STEERING DEVICE

(71) Applicant: GENTHERM GMBH, Odelzhausen (DE)

(72) Inventors: John David Lofy, Claremont, CA (US); Michael Weiß, Benediktbeuern (DE); Denise Philipp, Dachau (DE); Martin Adldinger, Holzheim (DE)

(73) Assignee: GENTHERM GMBH, Odelzhausen (DE)

(*) Notice: Subject to any disclaimer, the term of this patent is extended or adjusted under 35 U.S.C. 154(b) by 0 days.

(21) Appl. No.: 15/784,591

(22) Filed: Oct. 16, 2017

(65) Prior Publication Data

US 2018/0118248 A1    May 3, 2018

Related U.S. Application Data

(63) Continuation of application No. 14/707,261, filed on May 8, 2015, now Pat. No. 9,815,488.

(60) Provisional application No. 62/069,367, filed on Oct. 28, 2014.

(30) Foreign Application Priority Data

May 13, 2014  (DE) .................. 10 2014 006 826

(51) Int. Cl.
 B62D 1/06   (2006.01)
(52) U.S. Cl.
 CPC .................. *B62D 1/065* (2013.01)

(58) Field of Classification Search
 CPC ............... B62D 1/065; B60H 1/00292; B60H 2001/003
 See application file for complete search history.

(56) References Cited

U.S. PATENT DOCUMENTS

| | | |
|---|---|---|
| 1,388,488 A | 8/1921 | Senn |
| 1,615,635 A | 1/1927 | Kuno |
| 2,163,450 A | 6/1939 | Preble |
| 2,835,777 A | 5/1958 | Gates et al. |
| 3,165,620 A | 1/1965 | Miller |
| 3,740,567 A | 6/1973 | Atkins |
| 3,876,844 A | 4/1975 | Scherenberg |
| 4,547,655 A | 10/1985 | Kurata et al. |
| 4,549,069 A | 10/1985 | Oge |

(Continued)

FOREIGN PATENT DOCUMENTS

| | | |
|---|---|---|
| DE | 29802 C | 6/1884 |
| DE | 7149043 U | 4/1972 |

(Continued)

OTHER PUBLICATIONS

Korean Office Action from the Korean Intellectual Property Office for Application No. 10-2016-7031590 dated Mar. 5, 2018.

(Continued)

*Primary Examiner* — Elizabeth J Martin
(74) *Attorney, Agent, or Firm* — The Dobrusin Law Firm, P.C.

(57) ABSTRACT

A temperature control device for temperature control of a steering device, characterized in that the temperature control device has at least one heat-conducting device, at least one thermoelectric device, and at least one fluid transport apparatus.

18 Claims, 12 Drawing Sheets

(56) References Cited

U.S. PATENT DOCUMENTS

| | | | |
|---|---|---|---|
| 4,640,340 A | 2/1987 | Noda et al. | |
| 4,993,281 A | 2/1991 | Miller | |
| 5,006,421 A | 4/1991 | Yang et al. | |
| 5,605,643 A | 2/1997 | Reece | |
| 5,824,996 A | 10/1998 | Kochman et al. | |
| 5,847,360 A | 12/1998 | Lorenzen et al. | |
| 5,850,741 A * | 12/1998 | Feher | B60H 1/00292 62/3.61 |
| 5,935,474 A | 8/1999 | Grischenkov et al. | |
| 5,948,347 A | 9/1999 | Van Jaarsveld et al. | |
| 6,007,420 A | 12/1999 | Harm et al. | |
| 6,057,530 A | 5/2000 | Gurevich | |
| 6,093,908 A | 7/2000 | Haag | |
| 6,150,642 A | 11/2000 | Weiss et al. | |
| 6,172,342 B1 | 1/2001 | Khafagy et al. | |
| 6,172,344 B1 | 1/2001 | Gordon et al. | |
| 6,270,114 B2 | 8/2001 | Mai et al. | |
| 6,292,727 B1 | 9/2001 | Norton | |
| 6,294,758 B1 | 9/2001 | Masao et al. | |
| 6,298,750 B1 | 10/2001 | Kwener et al. | |
| 6,326,593 B1 | 12/2001 | Bonn et al. | |
| 6,392,195 B1 | 5/2002 | Zhao et al. | |
| 6,392,542 B1 | 5/2002 | Stanley | |
| 6,414,270 B1 | 7/2002 | Sugiyama et al. | |
| 6,441,344 B1 | 8/2002 | Bonn et al. | |
| 6,481,312 B1 | 11/2002 | Wissel | |
| 6,509,552 B1 | 1/2003 | Roske et al. | |
| 6,512,202 B2 | 1/2003 | Haag et al. | |
| 6,533,184 B1 | 3/2003 | Kim | |
| 6,577,023 B1 | 6/2003 | Stanley et al. | |
| 6,584,387 B1 | 6/2003 | Norton | |
| 6,668,682 B1 | 12/2003 | Emeneth et al. | |
| 6,668,683 B2 | 12/2003 | Fleckenstein | |
| 6,682,095 B2 | 1/2004 | Roychoudhury et al. | |
| 6,727,467 B1 | 4/2004 | Hadzizukic et al. | |
| 6,762,394 B2 | 7/2004 | Hobby | |
| 6,814,889 B1 | 11/2004 | O'Grady et al. | |
| 6,825,765 B2 | 11/2004 | Stanley et al. | |
| 6,838,647 B2 | 1/2005 | Nägele | |
| 6,862,807 B2 | 3/2005 | Wissel | |
| 6,968,263 B1 | 11/2005 | Norton | |
| 6,974,935 B2 | 12/2005 | O'Grady | |
| 7,019,261 B2 | 3/2006 | Worrell et al. | |
| 7,053,344 B1 | 5/2006 | Surjan et al. | |
| 7,083,227 B2 | 8/2006 | Brennan et al. | |
| 7,098,674 B2 | 8/2006 | Stanley et al. | |
| 7,145,102 B2 | 12/2006 | Hadzizukie et al. | |
| 7,180,306 B2 | 2/2007 | Stanley et al. | |
| 7,285,748 B2 | 10/2007 | Nelson et al. | |
| D559,158 S | 1/2008 | Garcia | |
| 7,321,311 B2 | 1/2008 | Rieth et al. | |
| 7,378,615 B1 | 5/2008 | King | |
| 7,521,940 B2 | 4/2009 | Koch et al. | |
| 7,500,536 B2 | 5/2009 | Bulgajewski et al. | |
| 7,656,169 B2 | 2/2010 | Scheckenbach et al. | |
| 7,663,076 B2 | 2/2010 | Tarry | |
| 7,714,256 B2 | 5/2010 | Weiss | |
| 7,735,932 B2 | 6/2010 | Lazanja et al. | |
| 7,838,804 B2 | 11/2010 | Krobok | |
| 7,908,941 B2 | 3/2011 | Menaldo et al. | |
| 7,928,341 B2 | 4/2011 | Ito et al. | |
| 8,015,835 B2 | 9/2011 | Lee et al. | |
| 8,400,323 B2 | 3/2013 | Fischer et al. | |
| 8,702,164 B2 | 4/2014 | Lazanja et al. | |
| 8,993,929 B2 | 3/2015 | Maranville et al. | |
| 2001/0001522 A1 | 5/2001 | Mai et al. | |
| 2002/0166407 A1 | 11/2002 | Germuth-Loffler | |
| 2004/0144197 A1 | 7/2004 | O'Grady | |
| 2004/0168540 A1* | 9/2004 | Weiss | B62D 1/065 74/552 |
| 2004/0169028 A1* | 9/2004 | Hadzizukic | B62D 1/065 219/204 |
| 2004/0261597 A1 | 12/2004 | Thiem et al. | |
| 2005/0077287 A1 | 4/2005 | O'Grady | |
| 2006/0033628 A1 | 2/2006 | Duvan | |
| 2006/0121843 A1 | 6/2006 | Koval | |
| 2006/0225441 A1 | 10/2006 | Goenka et al. | |
| 2007/0101728 A1 | 5/2007 | Ruetz | |
| 2008/0210048 A1 | 9/2008 | Yoneyama et al. | |
| 2009/0114368 A1 | 5/2009 | Niwa et al. | |
| 2009/0255916 A1 | 10/2009 | Katterman et al. | |
| 2010/0277186 A1 | 11/2010 | Bieck et al. | |
| 2010/0288073 A1 | 11/2010 | Shin et al. | |
| 2011/0006788 A1 | 1/2011 | Kim et al. | |
| 2011/0073582 A1 | 3/2011 | Morita et al. | |
| 2011/0148648 A1 | 6/2011 | Fischer et al. | |
| 2011/0290775 A1 | 12/2011 | Cubon et al. | |
| 2011/0307148 A1 | 12/2011 | Griffin et al. | |
| 2012/0001463 A1 | 1/2012 | Breed et al. | |
| 2012/0161953 A1 | 6/2012 | Nakagawa | |
| 2013/0020305 A1 | 1/2013 | Lamesch et al. | |
| 2013/0055849 A1 | 3/2013 | Parameshwara et al. | |
| 2013/0098890 A1 | 4/2013 | Virnich et al. | |
| 2013/0113239 A1 | 5/2013 | Akaike et al. | |
| 2013/0127211 A1 | 5/2013 | Aoki | |
| 2013/0127212 A1 | 5/2013 | Aoki | |
| 2013/0134745 A1 | 5/2013 | Aoki | |
| 2013/0180354 A1 | 7/2013 | Maranville et al. | |
| 2013/0186884 A1 | 7/2013 | Barfuss et al. | |
| 2013/0192272 A1 | 8/2013 | Ranalli et al. | |
| 2014/0090513 A1* | 4/2014 | Zhang | B62D 1/065 74/552 |
| 2014/0339211 A1 | 11/2014 | Barfuss et al. | |
| 2015/0102024 A1 | 4/2015 | Barfuss et al. | |
| 2015/0329137 A1* | 11/2015 | Onica | B62D 1/065 165/59 |

FOREIGN PATENT DOCUMENTS

| | | |
|---|---|---|
| DE | 9111356 U1 | 1/1992 |
| DE | 29515265 U1 | 2/1996 |
| DE | 19951224 A1 | 5/2001 |
| DE | 19953467 A1 | 5/2001 |
| DE | 19951323 C2 | 10/2001 |
| DE | 202004005181 U1 | 10/2004 |
| DE | 19735834 B4 | 7/2005 |
| DE | 102004006639 A1 | 9/2005 |
| DE | 102004027008 A1 | 12/2005 |
| DE | 102005053182 A1 | 5/2007 |
| DE | 60317179 T2 | 8/2008 |
| DE | 202012009655 U1 | 1/2014 |
| EP | 0992416 A2 | 4/2000 |
| EP | 1493647 A1 | 1/2005 |
| EP | 2028078 A1 | 2/2009 |
| EP | 2065234 A1 | 6/2009 |
| EP | 1645166 B1 | 7/2009 |
| EP | 1127356 B1 | 8/2011 |
| EP | 2572929 A1 | 3/2013 |
| JP | 62-128879 | 6/1987 |
| JP | H01178078 A | 7/1989 |
| JP | H02-007070 U | 1/1990 |
| JP | 10-230857 | 9/1998 |
| JP | 2006-176037 | 7/2006 |
| JP | 2009-275947 A | 11/2009 |
| KR | 20110002759 A | 1/2011 |
| KR | 20130057650 A | 6/2013 |
| WO | 0128842 A1 | 4/2001 |
| WO | 02/065029 A1 | 8/2002 |
| WO | 2003/047942 A1 | 6/2003 |
| WO | 2005/036930 A1 | 4/2005 |
| WO | 2005/093158 A1 | 10/2005 |
| WO | 2009/009029 A1 | 1/2009 |
| WO | 2010/065411 A1 | 6/2010 |
| WO | 2011/079092 A1 | 6/2011 |
| WO | 2012/038325 A1 | 3/2012 |
| WO | 2012/038326 A1 | 3/2012 |
| WO | 2012/113833 A1 | 8/2012 |
| WO | 2013/050621 A2 | 4/2013 |

OTHER PUBLICATIONS

Potentially Related U.S. Appl. No. 14/509,744, filed Oct. 8, 2014 Published as 2015/0102024.

(56) References Cited

OTHER PUBLICATIONS

Potentially Related U.S. Appl. No. 14/709,796, filed May 12, 2015.
Potentially Related U.S. Appl. No. 14/028,720, filed Sep. 17, 2013 published as 2014/0090513.
Potentially Related U.S. Appl. No. 14/275,999, filed May 13, 2014 published as 2014/0339211.
International Preliminary Report on Patentability from the European Patent Office for Application No. PCT/US2015/029858, dated Nov. 15, 2016.
International Search Report and Written Opinion from the European Patent Office for Application No. PCT/US2015/029858, dated Jan. 10, 2015.

* cited by examiner

_(1)_

TEMPERATURE CONTROL DEVICE FOR A STEERING DEVICE

FIELD

The present teachings relate to a temperature control device for conductively cooling a steering device.

BACKGROUND

It is known to blow steering wheels with an air stream from an air conditioning system, which stream exits from a dashboard.

It is furthermore known from DE 29802 to cool steering wheels with Peltier elements.

From DE 19735834, it is known to have air flow through a hollow steering wheel and have the air exit through holes in the steering wheel surface.

From WO 01/28842, and U.S. Pat. No. 4,640,230 a steering wheel is known in which a fluid is pumped through the steering wheel, a heat exchanger, and a heat storage unit in a closed circuit.

From DE 19951323, a steering wheel is known in which a heat storage means that can change the aggregate state is incorporated into the steering wheel. The teachings of DE19735834, WO01/128842, U.S. Pat. No. 4,640,230, and DE19951323 are incorporated by reference herein in their entirety for all purposes.

However, cooling devices for steering wheels according to the known prior art are all limited in their effectiveness, in terms of time, are not very efficient or are almost impossible to implement technically.

What is needed is a temperature control device that conductively cools a steering wheel. It would be attractive to have a temperature control system that cools occupant contact areas so that the locations where an occupant grips a steering device are cool to the touch. What is needed is a temperature control device that is flexible and can conform to the shape of a steering wheel without read through.

SUMMARY

The teachings herein provide a temperature control device for temperature control of a steering device, wherein the temperature control device has at least one heat-conducting device, at least one thermoelectric device, and at least one fluid transport apparatus The present teachings relate to a temperature control device for a steering device in accordance with the teachings herein including a temperature control device for temperature control of a steering device, wherein the temperature control device has at least one heat-conducting device, at least one thermoelectric device, and at least one fluid transport apparatus, in order to keep the temperature of a steering device at an acceptable temperature level.

The teachings herein provide the temperature control device according to the teachings herein, wherein the heat-conducting device has at least one heat-conducting strand and at least one heat-supporting conductor connected with the former in thermally conductive manner.

The teachings herein provide a temperature control device according to the teachings herein, wherein the heat-conducting strand is a heat-conducting pipe, and the heat-supporting conductor is a flat body connected with the former in material-fit manner.

The present teachings provide a steering device having at least one temperature control device according to the teachings herein, wherein the steering device has at least one covering that has a decorative component that covers at least part of the surface of the steering device, and has at least one heat transport component that permits heat transport through the decorative component or along the decorative component.

The teachings herein provide a temperature control device for temperature control of a steering device, wherein the temperature control device has at least one thermal conductive element, at least one thermoelectric device, and at least one fluid transport device.

The teachings herein provide a temperature control device according to the teachings herein, wherein the thermal conductive element includes a flexible ribbon formed of braided strands of a ductile metal material.

The teachings herein provide a conditioning system comprising: a connecting device having a movable component and a static component; a conducting device connected to an extending from the movable component; and a fluid transport device connected to the static component; wherein the fluid transport device provides fluid into the connection device and the connecting device assists in transferring thermal energy to the conducting device so that the conducting device conductively cools a surface that is contacted by a user.

The present teachings provide a temperature control device that conductively cools a steering wheel. The present teachings provide a temperature control system that cools occupant contact areas so that the locations where an occupant grips a steering device are cool to the touch. The present teachings provide a temperature control device that is flexible and can conform to the shape of a steering wheel without read through.

BRIEF DESCRIPTION OF THE DRAWINGS

In the following, the teachings will be explained using examples, making reference to the drawings. These examples serve only as an illustration. They do not limit the scope of the teachings.

DETAILED DESCRIPTION

Figure 1:
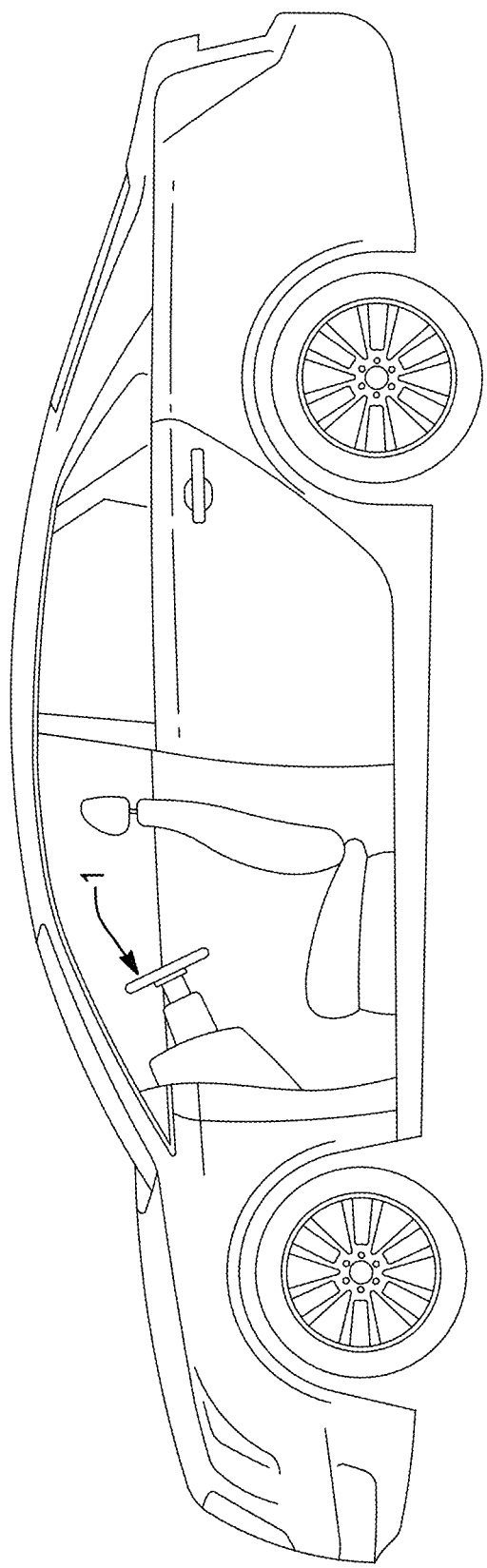
FIG. 1 shows a vehicle having a steering wheel tempered according to the teachings.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. Although one or more teachings herein may be taught with reference to a single figure and/or embodiment those features may be employed in combination with other elements and embodiments of the teachings herein. Thus, use of an element with a single illustrative embodiment and/or figure should not preclude one skilled in the art with allowing the element with another embodiment or teaching as is found herein. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description. The present teachings claim priority to a German Provisional Patent Application No. DE10 2014 006 826.9 filed May 13, 2014 and U.S. Provisional Patent Application Ser. No. 62/069,367, filed on Oct. 28, 2014 the teachings of which are incorporated by reference herein for all purposes.

The present teachings relate to providing conditioning to one or more movable components. The conditioning may provide comfort to an occupant. The conditioning may remove heat from an occupant. The conditioning may heat and/or cool through convection (i.e., moving a fluid over an outside of an occupant contact area), through conduction (i.e., moving a fluid through an inside of an occupant contact area), or a combination of both. The conditioning may occur through a combination of convection and conduction depending on whether the device is being heated and/or cooled. The conditioning may be provided to an occupant contact location, a piece of equipment that is movable, or both. The temperature control device may be located entirely in the movable part. However, the temperature control device may include parts that are located in the movable part and parts that are located in the static part. The movable part as taught herein may be a component that is longitudinally movable, rotationally movable, laterally movable, or a combination thereof. A steering wheel is one preferred component. The one or more movable components may move with, along, or relative to one or more stationary components. The one or more movable parts may be any of the steering devices discussed herein, a shifter, or both. The one or more movable parts, stationary parts, or both may include a conditioning system.

The conditioning system may include a conducting device, a fluid transport device, a connecting device, or a combination thereof. The conditioning system may provide components in a stationary part and some components in a movable part and connect the conducting devices in the movable parts to the components in the stationary part. The conditioning system may provide conditioning that spans between stationary parts and movable parts. The conditioning system may include any of the components discussed herein in communication with a connecting device.

The one or more connecting devices may function to fluidly connect a stationary part to a movable part. The one or more connecting devices may function to allow a fluid to move from a stationary component to a movable component while preventing heat conducting strands, thermal conducting element, or both (hereinafter conducting element) form bending, kinking, breaking, being rotated, being stretched, or a combination thereof. The one or more connecting devices may function to allow the one or more conducting elements and preferably a plurality of conducting elements to remain static relative to the movable component while the movable component rotates and/or moves. The connecting devices may function to allow relative movement of some of the conducting elements relative to a stationary component while holding the conducting elements static relative to the movable component. The connecting device may have a fluid channel that extends therethrough and connects fluid transport devices on the static component with conducting elements on the movable component. The connecting device may allow fluid to pass between a static component and a movable component without any air guidance devices (e.g., lines). The connecting device may have one or more chambers that receive fluid (i.e., connector channels). The connecting device may have one or more fluid paths so that fluid extends from a static component to a movable component. The connecting device may have one open space. The channels, open space, or both may include one or more heat exchangers, one or more thermal electric devices, one or more peltier devices, or a combination thereof. The connecting device may provide one or more sealed chambers that allow fluid to pass into contact with the conducting elements without the conducting elements being directly subjected to movement of the movable component. The one or more connecting devices may decouple the fluid transporting device from the movable parts so that the movable parts can move without interfering with the fluid transport device to move fluid to a location of interest. The one or more connecting devices may include a movable component, a static component, or both that form a chamber for fluidly connecting a movable part with a fluid transport device.

The one or more movable components may function to move with a movable part. The one or more movable components may function to move relative to a static part, a static component, or both. The one or more movable components may function to form a static connection with one or more conducting elements located in the movable component. The one or more movable components may allow for rotational movement, longitudinal movement, lateral movement, or a combination thereof without loss of fluid movement. The one or more movable components may have one or more surfaces that contact a static part, contact one or more bearings, contact one or more seals, form a bearing surface, or a combination thereof. The one or more movable components may seal a static part, be sealed by a static part, or a combination of both. The one or more movable components may form one or more surfaces that enclose a chamber and/or channel (e.g., supply channels, through channels, and/or connector channels as discussed herein). The one or more movable components may be generally cylindrical, square, rectangular, round, circular, toroidally shaped, or a combination thereof. The one or more movable components may longitudinally slide along a static components and one or more channels may extend between the static components and movable components. The one or more channels may be in a central location of the static components and the movable components may move so that the movable component is always in fluid communication with the one or more channels. The one or more movable components may extend fully or partially around an outside of a static component. The one or more movable components may create all or a portion of a channel (e.g., a supply channel, a collector channel, a connector channel, or a combination thereof). The one or more movable components may extend into a static components. The one or more movable components may receive a portion of a static component to form a seal. The one or more movable components and static components may be separated by one or more seals (e.g., a gasket, a rubber piece, an "O" ring, or a combination thereof). The one or more movable components may include one or more air inlets, one or more air outlets, or both. The one or more movable components may include 2 or more, 3 or more, 4 or more air inlets. The one or more movable components may include 2 or more, 3 or more, or 4 or more air outlets. The one or more movable components may include a plurality of air inlets, a plurality of air outlets, or both. The one or more movable components may include one or more conducting slots. The air inlets, the air outlets, or both may be connected to conducting elements. Preferably, the movable component is free of inlets and outlets. More preferably, the movable component includes one or more conducting slots that the conducting elements extend through so that a portion of the conducting elements are located within the connecting device and a portion of the conducting elements are located outside of the connecting device. The air inlets, the air outlets or both may be in communication with a supply channel in the connecting device. The supply channel may be in fluid communication between the movable components and the static components. The supply channel may extend substantially the entire length of the movable component, the static component, or both. The one or more movable components may extend around one or more static components or vice versa.

The one or more static components may function to connect to a steering rod and/or steering device and permit for movement of the steering rod and/or steering device relative to a static part. The one or more static components may function to connect to a stationary part (e.g., a static part) and provide a base for the movable component. The one or more static components (e.g., a stationary component) may function to connect to one or more conducting elements, one or more fluid transfer devices, or both extending from the static component, the movable component, or both. The one or more static components may include a shaft aperture to connect to a shaft of a steering device. For example, the shaft aperture may be a hole in the connecting device that the steering wheel rod, steering wheel pivot axis, or both extend through. The one or more static components may function to create a portion of a supply channel, connector channel, or both. The one or more static components may create a longitudinal channel, a lateral channel, a radial channel, or a combination thereof. The static components may include one or more channels (e.g., a supply channel and a collector channel). The static part may be connected to a static component and a movable component and/or may move about the static part. The static components may have a movable component that moves within the static components. The static components may form a fixed connection with one or more conducting elements. The static components may connect with or be in communication with conducting elements. The static components may have one concentric channel or a series of concentric channels. The static components may have channels that are circular, generally "L" shaped, square, rectangular, or a combination thereof. The static components may have channels that extend parallel to an axis of a movable component. The static components may have channels that extend outward around an axis of the movable component. The one or more static components may have one or more through channels that extend from a first side of the static components to the second side of the static components. For example, the static components may include a through channel that extend from a first half through a divider to a second half. The static components and movable components may be separated by one or more seals, one or more bearings, one or more gaskets, one or more "O" rings, or a combination thereof. The static components and movable components may be connected together to form a supply portion, a receiver portion, or both.

The one or more supply channels may function to provide air from a fluid transfer device through the connecting device. The one or more supply channels may be a fluid path through a connecting device. The one or more supply channels may be free of any lines, tubes, hoses, or a combination thereof. The one or more supply channels may replace a line, tube, hose, or a combination thereof. The one or more supply channels may extend towards the occupant contact areas from a fluid transport device. The one or more supply channels may include conducting elements that extend from the movable part into the connecting device. The one or more supply channels may have a portion that is fully enclosed within the static component, the movable component, or both. The one or more supply channels may have a portion that is formed between the static component, the movable component, or both. The one or more supply channels may have a portion that is formed between the static component and the movable component, a portion that is fully formed in the static component, a portion that is fully formed within the movable component, or a combination thereof. The one or more supply channels may house one or more thermal electric devices, one or more heat exchangers, one or more conducting elements, or a combination thereof. The connecting device may include one or a plurality of supply channels that are connected to an inlet, an outlet, or both.

The one or more air outlets may function to remove air from the connecting device so that thermal energy is removed. The one or more air outlets may direct waste air away from the conducting elements, thermal electric devices, heat exchangers, or a combination thereof. The one or more air outlets may be located in the static component, the movable component, or both. The one or more air outlets may be located in the static component and moved relative to the movable component or vice versa. The one or more air outlets may move air away from the connecting device, may receive air into the connecting device, or both. The one or more air outlets may provide air from the connecting device to a thermal electric device, heat exchanger, conducting element, peltier device, or a combination thereof. The one or more air outlets may provide air from the connecting device to a waste area, an air mover, or both. The one or more air outlets may be located proximate to an air inlet, a fluid transport device, or both. The one or more air outlets may be connected to an air mover so that air is pulled out of the connecting device through the fluid transport device. The one or more air outlets may lead into the fluid transport device. The one or more air outlets may be used to push air through the conditioning system or pull air through the conditioning system. The one or more air outlets may extend directly into ambient, into a static part, a movable part, or a combination thereof. The one or more air outlets and air inlets may be located a sufficient distance apart so that waste air is not pulled into the fluid transport device and recirculated through the connecting device.

The one or more air inlets may function to provide air into the connecting device. The one or more air inlets may function to provide ambient air into the connecting device to remove waste thermal energy (e.g., heat or cool from a heat exchanger). The one or more air inlets may be located on a discharge side of a fluid transport device (e.g., blower). The one or more air inlets may be located on a connecting device and air may be pulled into the connecting device by the fluid transport device pulling air into the connecting device. The one or more air inlets may be located proximate to a thermal electric device, a heat exchanger, an end of a conducting element, or a combination thereof.

The one or more conducting elements may function to conduct thermal energy to a location of interest. The one or more conducting elements may function to remove heat through conduction, apply heat through conduction, or both. The one or more conducting elements may be fluid filled, free of fluid, or both. The one or more conducting elements may be free of circulation of a fluid. If fluid is present, the circulation of fluid may be due to phase change of the fluid. For example, as fluid changes from a liquid to a gas the fluid travels from one end of the conducting elements to another location in the conducting elements. The one or more conducting elements may be one or more elements and preferably a plurality of elements. The conducting elements may split and extend in different directions. Two or more groups of conducting elements may extend into a movable part. The conducting elements may separate into groups that extend about 45 degrees or more of a steering wheel, about 60 degrees or more, about 75 degrees or more, or about 90 degrees or more. The conducting elements may be split into 2 or more segments, 3 or more segments, or even about 4 or more segments. The one or more conducting elements may be heat conducting strands.

The one or more heat conducting strands and preferably a plurality of heat conducting strands may function to receive thermal energy and/or provide thermal energy through conduction only. The one or more heat conducting strands may include one or more heat supporting conductors that increase surface area to assist in the exchange of thermal energy. The one or more heat supporting conductors may be connected to and extend from the heat conducting strands. The heat conducting strands may each be a gas tight tube. The gas tight tubes may be filled with a fluid. Preferably, the gas tight tubes are filled with a liquid at ambient temperature. The liquid may go through phase changes as heat is applied to the heat conducting strands so that the heat may be provided to an occupant or removed from an occupant. The gas tight tubes may be heat pipes. The gas tight tubes may be filled with any fluid that moves thermal energy between a heat exchanger, thermal electric device, or both and an occupant contact area. The fluid may be water, glycol, ethylene glycol, diethylene glycol, propylene glycol, coolant, glycerol, or a combination thereof. The conducting elements may be free of fluid.

The conducting elements may be thermal conducting elements. The thermal conducting elements may be a solid material, a braided material, or both. The thermal conducting elements may be made of metal. The thermal conducting elements may be made of copper, silver, silver coated copper, nickel, iron, steel, copper or silver coated nickel, steel, iron, or a combination thereof. The thermal conducting elements may be made of a malleable material. The thermal conducting elements may be a plurality of strands that are connected together and are movable so that a user cannot feel the thermal conducting elements, there is no read through, or both. The conducting elements may transfer thermal energy along their length, thus, there may be a temperature gradient along the length of the conducting elements. The thermal conducting elements may wrap around a portion of a circumference of a steering wheel (e.g, a circumference when viewed in the cross-section). The thermal conducing elements may wrap about 90 degrees or more, about 180 degrees or more, about 270 degrees or more, or even about 360 degrees. The conducting elements may be in communication with a thermal electric device, a heat exchanger, or both.

The thermal electric device may provide heat and/or cool to a portion of the conducting element. The thermal electric may be switched between providing heat and cool. The thermal electric device may be directly connected to the conducting elements to that thermal energy is provided to the conducting elements. The thermal electric device may be connected to one or more heat exchangers to remove unwanted thermal energy. The thermal electric device may provide thermal energy to the heat exchanger and the heat exchanger may provide the thermal energy to the conducting element. The thermal electric device, the heat exchanger, or both and the conducting elements may be connected at an interface, a thermal glue, a thermal paste, a fastener, conductive adhesive, a thermal grease, solder, or a combination thereof.

Figure 2:
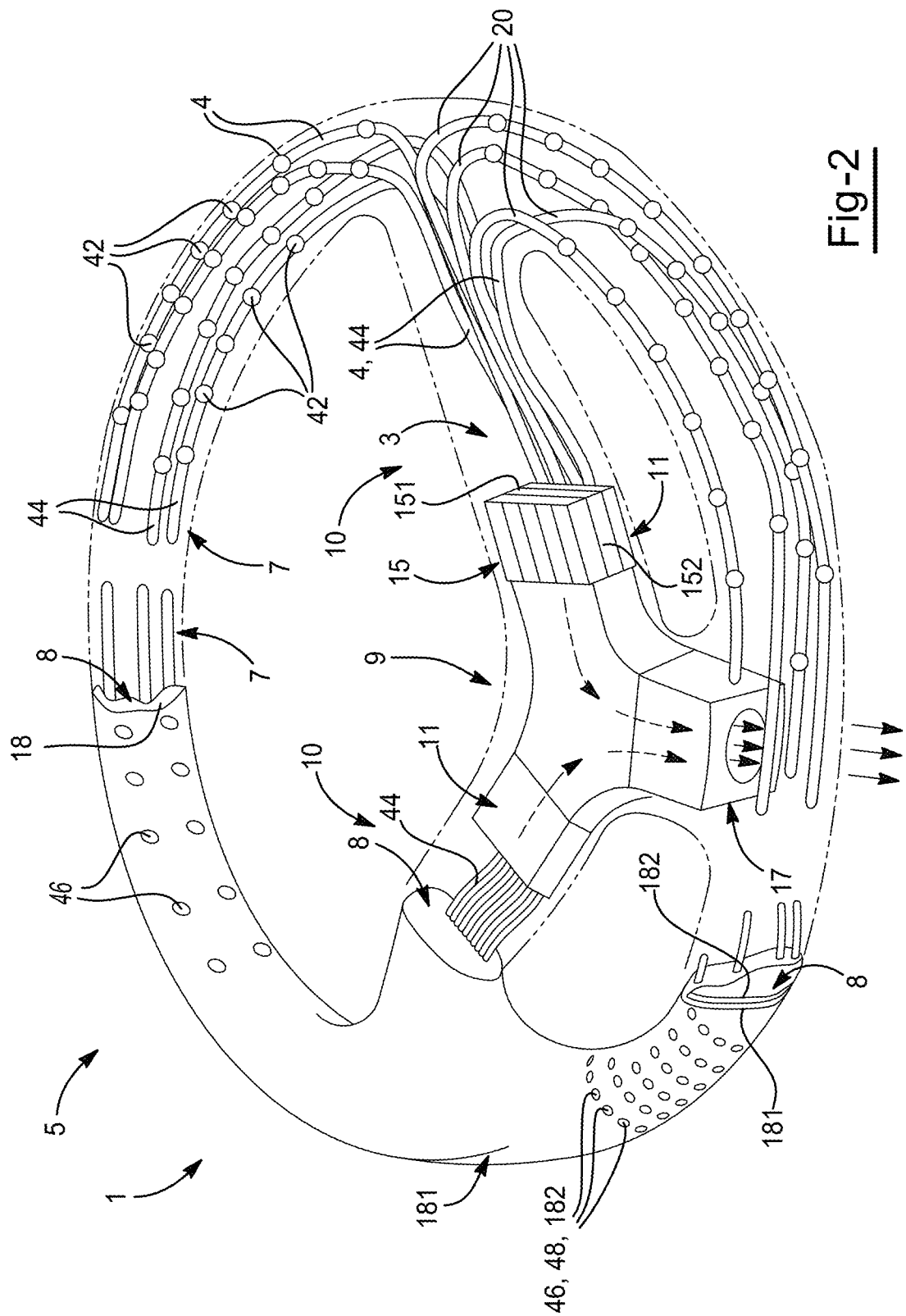
FIG. 2 shows a perspective representation, of a temperature control device in a steering wheel.

The interface may function to provide thermal conduction between the conducting elements and the thermal electric device, the heat exchanger, the peltier device, or a combination thereof. The interface may be a connection between that assists in transferring thermal energy. The interface may be FIGS. 1 and 2 show a vehicle and a steering device 1 provided in it, here in the form of a steering wheel. The steering device 1 has a grip piece 5 that serves for transfer of steering movements to a vehicle.

The grip piece 5 has a hard support 6, which is formed from a metal rod in the present case. Furthermore, it possesses a cushion 8 composed of foam material, which encloses the support 6. The outermost layer of the grip piece 5 is formed by a covering 18. It can be part of the foam material of the cushion 8 or be applied separately, as shown here, for example made of leather.

The steering device 1 has a center piece 9 that is connected with the grip piece 5 by way of spokes 10. This center piece 9 serves, in the present case, for connecting the grip piece 5 with a steering axle (not shown) and for accommodating an air bag (not shown).

The steering device 1 is equipped with a heat-conducting device 4. A heat-conducting temperature control device is understood to be a device for transport of heat energy, particularly along a grip piece 5. This particularly includes heat-conducting strands 44, for example in the form of heat-conducting pipes, which function according to the following principle.

A heat-conducting pipe possesses a gas-tight tube 20. This is usually formed, at least in part, from a heat-conducting metal such as aluminum or copper.

A fluid 24 is enclosed in the interior of the tube 20. A specific pressure prevails in the tube 20. The type of fluid 24 and the level of the pressure determine the evaporation temperature of the fluid 24 in the tube. The evaporation temperature is selected in such a manner that it approximately corresponds to the temperature desired at the steering device 1. For this purpose, an evaporation temperature of approx. 25-35° C. is preferably selected. It is practical if the fluid is water. However, other substances that can evaporate can also be used. The fluid preferably has a boiling point between 25° C. and 60° C., preferably between 25° C. and 35° C., particularly preferably about 30° C. In the case of water, at usual summer temperatures, the pressure within the tube 20 lies between 0.01 bar and 0.7 bar, preferably between 0.05 and 0.1 bar, particularly at 0.04 bar.

The tube has at least two functional regions 7, 11, which preferably correspond to length sections of the tube 20.

The first, grip-side functional region 7 serves for exchanging heat along the steering device 1, between the heat-conducting strands 44 and the steering device 1. The second functional region 7 serves for coupling this heat into or out of the heat-conducting strand, from an external heat source or to an external heat sink. Both regions are equipped with a transport device 26 that serves for transport of condensed fluid 24 from one functional region to the other. The transport device 26 is preferably formed from an absorbent material, for example a nonwoven fabric, with which the inner wall of the tube is lined in layer-type manner. Preferably, the inside of the heat-conducting strand 44 is uniformly lined with the transport device 26, either over the full area or in accordance with a regular or randomly distributed pattern.

The first and the second functional region 7, 11 stand in connection with one another by way of a jointly enclosed gas exchange volume 28.

If the first functional region 11 is heated during cooling operation, for example as the result of sun radiation, the liquid in the transport device, for example in the nonwoven fabric, formed by the fluid 24 evaporates. The vapor passes over into the joint gas exchange volume 28. This vapor now transports heat to all those locations where heat emission takes place along the heat-conducting pipe. This is the case in the second functional region, during cooling operation, where waste heat is removed. This is because fluid condensed there makes room for further heat-conducting vapor that flows in. The condensed fluid 24 from the second functional region is in turn transported back into the first functional region 11, in this transport device 26, for example in the nonwoven fabric, in order to replace fluid that has evaporated there. If heat is removed from the first functional region 11, for example in the case of cold interior temperatures, fluid condenses there and thereby delivers heat there. The fluid circuit then runs in the opposite direction.

The grip piece 5 in its cushion 8 preferably has a recess 32 that runs at least partially along the steering device 1. The grip-side functional region 11 of the heat-conducting strand 44 is set into this recess. However, it is also possible to foam the heat-conducting strand 44 into the cushion 8 or to fill interstices between cushion 8 and heat-conducting strand 44 that remain in a thermally conductive cushion foam with a heat-conducting filler mass, for example a heat-conducting paste on the basis of silicone rubber.

Figure 3:
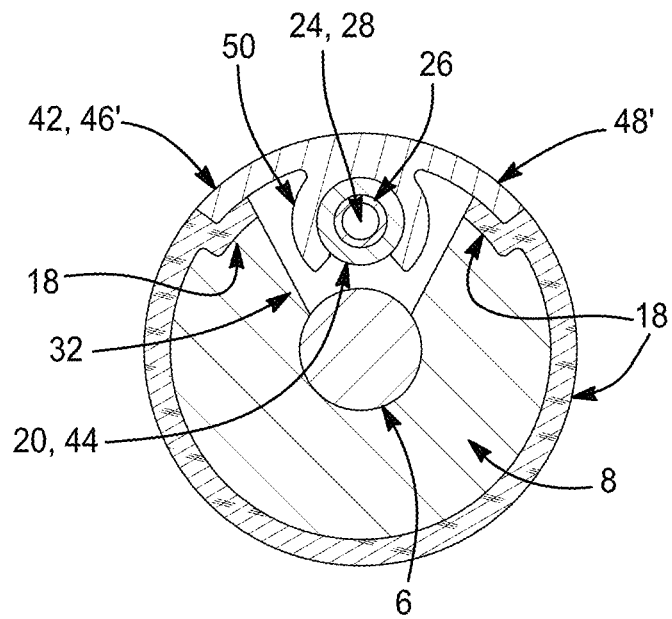
FIG. 3 shows a temperature control device in a steering wheel, in cross-section.

The recess 32 is preferably a groove that runs around the steering wheel circumference. In this connection, the outermost position relative to the steering wheel pivot axis 70 as in FIG. 3 is particularly suitable with regard to the steering wheel cross-section.

It can also be advantageous to equip a steering wheel with four heat-conducting strands 44 and to dispose these offset by about 90°, in each instance, about the steering wheel cross-section, as shown in FIG. 2.

Preferably, the heat-conducting device 4 has at least one heat-supporting conductor 42. In this way, heat can be better collected along a covering 18 of a steering device 1, and conducted away by means of a heat-conducting strand 44. It is also possible to thereby feed heat in, and to distribute it along the steering device 1 by means of a heat-conducting strand 44.

At least one heat-supporting conductor 42 is preferably formed, at least in part, from a heat-conductive material, for example from aluminum, copper, an alloy, or another metallic or metal-containing material.

Preferably, at least one heat-supporting conductor 42 is flat. This should preferably be understood to mean bodies having a spatial expanse in two dimensions that clearly outweighs their expanse in a third dimension. Possibilities are, for example, plates, films, spirals, lattices, networks, structures in the manner of corrugated sheet, etc. Preferably, these are disposed close to the surface under a covering 18 of the steering device 1. Preferably, they are arched or domed about one or more axes, in order to follow the outer contour of the steering device, at least section by section, and not to show through the covering. Bodies having a base surface that has rounded contours are therefore also particularly preferred.

Flat small plates composed of copper or aluminum, having a rounded or oval base surface and a diameter or longitudinal dimensions between 8 and 30 mm, preferably between 8 and 20 mm, are particularly practical. In order for the small plates to be sufficiently thick so as to conduct sufficient heat, on the one hand, but on the other hand thin enough so that they can be bent to match the steering wheel contour, they preferably have a thickness between 0.2 to 2 mm, preferably between 0.3 and 0.8 mm.

Preferably, at least one heat-supporting conductor 42 is connected with at least one heat-conducting strand 44 in thermally conductive and material-fit manner, preferably by means of heat-conducting adhesive, solder, particularly lead-free tin solder, or a similar material as that of the heat-supporting conductor 42 or of the heat-conducting strand 44. Particularly good stability and heat conduction occur if a heat-conducting strand 44 containing aluminum is soldered to a heat-supporting conductor 42 containing aluminum, after at least one of the two components has been nickel-plated before soldering, at least at the soldering location.

The covering 18 or a decorative component 181 provided as an integral part of the covering 18 is preferably formed, at least in part, from leather, synthetic leather or wood. If leather is used, this is preferably split leather, preferably having a thickness of less than 2 mm, preferably less than 1 mm, preferably less than 0.5 mm. This reduces the thermal transition resistance. Preferably, the covering 18 and/or the decorative component 181 is provided with a plurality of holes 48 or perforations, in order to facilitate passage of heat through the leather layer of the covering 18, which is a strong heat insulator.

Preferably, the covering 18 has a heat transport component 182. The heat transport component 182 preferably forms a flat support layer to which at least one decorative component 181 is applied. The heat transport component 182 is preferably composed of a material that has good heat conductivity, is elastic, flexible and/or tear-resistant, such as silicone rubber. This allows heat transport through or along the decorative component. Preferably, the heat transfer component 182 is composed of a material that is at first liquid, gel-like, or can be plastically shaped. It is applied to the decorative component 181 and then becomes solid. Preferably, at least part of the holes 48 are filled with a heat-conducting material, in order to form an outer and an inner heat exchange surface, in each instance, at each of these holes, on the top and bottom side of the decorative component. The material used for the heat transfer component 182 is a possibility as a filling. It is practical if the filling of the holes 48 is filled with material fit with the heat transport component 182 or parts of it, preferably composed of the same material, preferably during the same work step.

Preferably, the covering 18 is provided with at least one bridging piece 48. A bridging piece is a heat-conductive component that has at least one heat exchange surface on the inner surface of the covering, in order to exchange heat with the interior delimited by the covering. Furthermore, the component has at least one heat exchange surface on the outside of the covering 18. The bridging piece 46 connects these two exchange surfaces with one another. Preferably, the bridging piece 46 penetrates the covering 18 for this purpose. Preferably, it is composed of material having good heat conductivity. It can be formed, for example, by a metallic rivet as in FIG. 2, or by a seam having threads with metallic fibers or wires. However, the filling of the holes 48 by means of the heat transport component 182 can also be considered a bridging piece 46. Preferably, at least one bridging piece 46 is disposed closely on at least one heat-conducting strand 44. Preferably, a plurality of bridging pieces 46 are provided on the covering 18. Preferably, their placement follows the course of the at least one heat-conducting strand 44.

Preferably, at least one bridging piece 46 is disposed on a heat-conducting strand 44, at least in part. Preferably, a plurality of bridging pieces 46 is assigned to a corresponding number of heat-supporting conductors 42 and disposed to cover these, at least in part. In this way, the heat exchange between the steering wheel surface and the heat-conducting strand 44 is improved. Preferably, a plurality of rivets are disposed at practical intervals along a heat-conducting strand 44, by way of a plurality of small metal plates.

In order to guarantee effective temperature control, at least one thermoelectric device 15 is disposed on the second functional region 7. When electrical voltage is applied to its surface that faces the heat-conducting device 4, this device generates cold when it is in cooling operation and heat when it is in heating operation. On its surface that faces away from the heat-conducting device 4, it generates heat when cooling and coolness when heating. This heat is conducted away by means of a fluid stream that passes by, and conducted away from the steering wheel and the driver, out of the steering wheel, by means of a fluid transport apparatus 17. Missing heat is also supplied by means of this fluid stream. Preferably, an axial fan is provided for both purposes, which fan is disposed on the underside of the center piece 9, facing away from the driver, and is operated in suction mode. However, a different kind of flow machine can also be provided, for example a radial blower or a rotary pump. Air is preferred as a fluid. However, a medium that is liquid, at least part of the time, such as water or alcohol, can also be provided, circulating in a closed circuit.

In a particularly advantageous embodiment, at least one heat-conducting device 15 has at least one flat Peltier element 151. The Peltier element 151 can be formed from one or more semiconductor components. A heat exchanger 152 is disposed on its one surface. This is understood to be a device that can exchange energy between an electric current and a fluid current, for example a plurality of heat exchange sheets, a plate having heat exchange ribs, or the like. Preferably, this heat exchanger 152 is composed, in part, of copper or aluminum.

An interface having at least one heat-conducting strand 44 is provided on the opposite surface of the Peltier element 151. Preferably, interstices between Peltier element 151 and heat-conducting strand 44 are filled with heat-conducting material, in order to facilitate heat transfer. Preferably, at least four heat-conducting strands 44 are disposed next to one another here, which are then disposed, in their further course in the grip piece, parallel to one another and offset by 90 about the cross-section of the grip piece 5. Preferably, the steering device is divided into working sections that correspond to a quadrant of the steering device, in each instance, or to half of a section between two spokes 10, in each instance. Preferably, a heat-conducting strand 44, in each instance, supplies only one such working section, in each instance, in order to guarantee sufficient fluid and heat transport in its interior. Preferably, at least one thermoelectric device 15 and heat-conducting strands 44 of at least two working sections are assigned to at least one spoke 10. Preferably, at least eight heat-conducting strands are therefore disposed on at least one Peltier element 151, preferably next to one another and in thermal contact with the Peltier element, of which four are assigned to a first working region, and another four to a second working region, in each instance. The spoke 10 preferably lies between these two working regions.

Preferably, at least two spokes 10 are assigned to a separate thermoelectric device 15, in each instance. They are preferably supplied with fluid, for example ambient air or liquid of a cooling or heating circuit, by a common fluid transport apparatus 17, for example by means of a forked channel.

The second functional region 7 on the interface side is disposed outside of the grip piece 5. It is passed into the center piece 9 by way of one of the spokes 10.

This functional region 7 is disposed within the center piece 9, on an underside of the steering device, facing away from the driver.

It can be practical to configure at least one bridging piece 46' as shown in FIG. 3 as a disk-shaped or rail-shaped component, which engages, at least in part, into oblong holes 48' and/or covers them. Preferably, this is a decorative strip, made of metal, in practical manner, which is disposed on the outer edge of the steering wheel cross-section, on the circumference of a steering wheel, relative to the steering wheel axis 70.

Preferably, a holding device 50 is provided for attaching the bridging piece 46'. This device is preferably structured in one piece with the bridging piece 46'. However, it can also be provided as part of the heat-conducting strand 44 or as a third part.

Preferably, the holding device 50 is a snap or engagement device that encloses the heat-conducting strand 44, at least in part and at least locally, or engages into it. Preferably, the holding device produces thermally conductive contact between the heat-conducting strand 44 and the bridging piece 46'. Preferably, the holding device 50 encloses at least 50% of the surface of the heat-conducting strand 44, and preferably lies against it, preferably by at least 50% of the circumference of the heat-conducting strand 44.

It can also be practical to combine the two embodiments of FIGS. 2 and 3 with one another.

Figure 5:
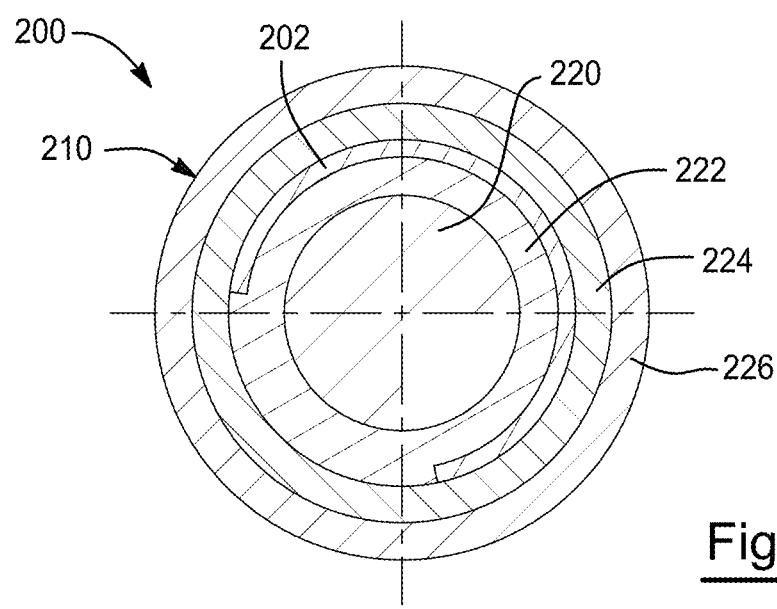
FIG. 5 shows a grip piece of the steering wheel of FIG. 4, in cross-section.
Figure 4:
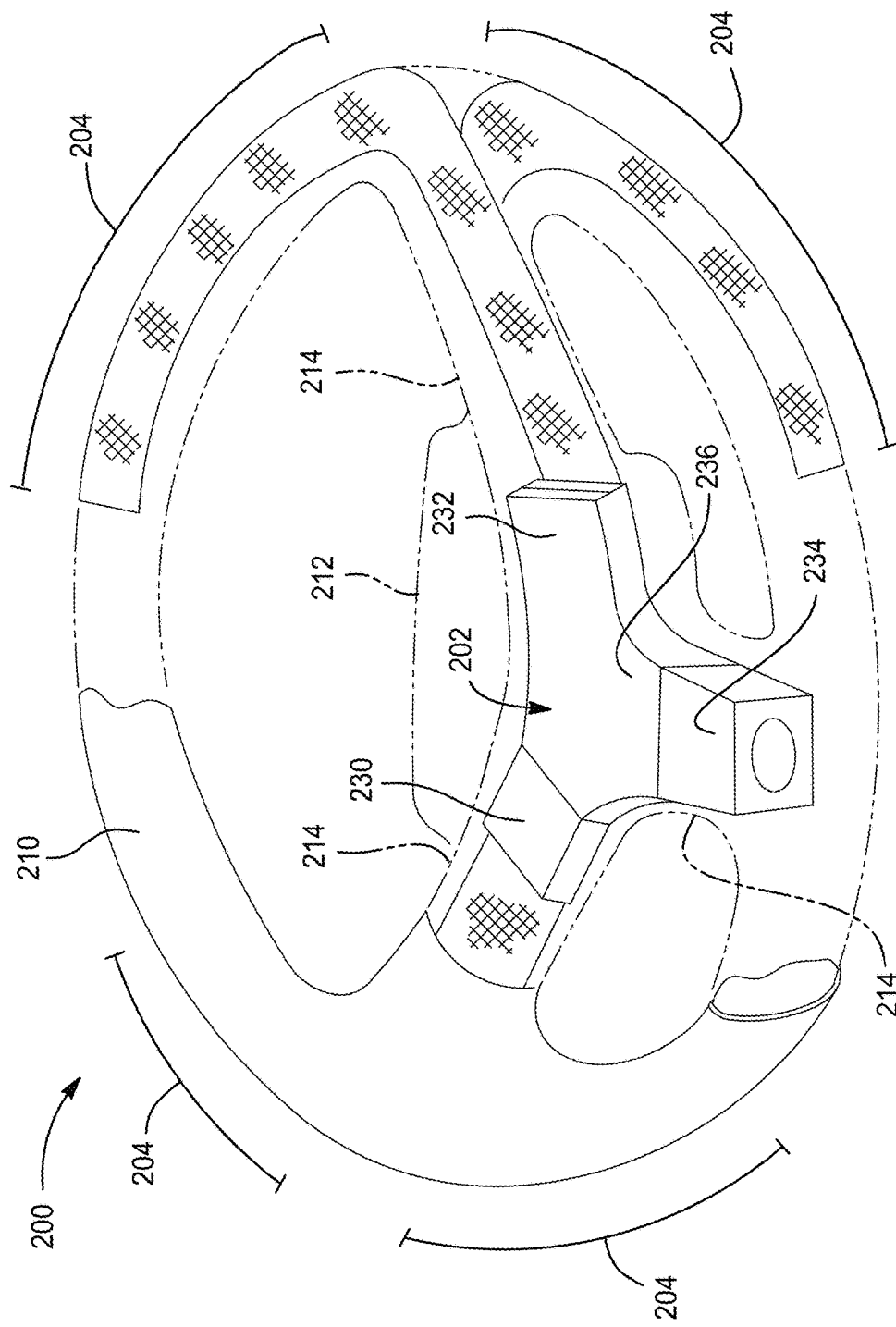
FIG. 4 shows a perspective representation, of a temperature control device in a steering wheel.
Figure 6:
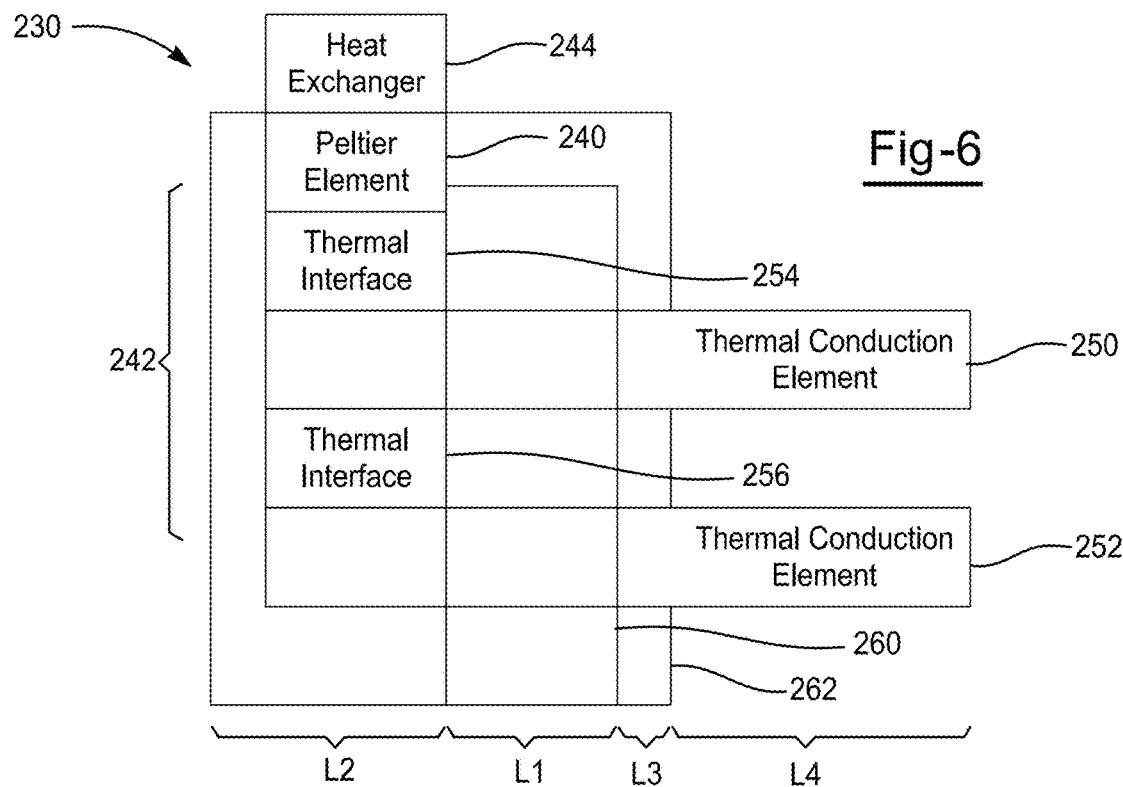
FIG. 6 schematically shows the temperature control device of FIG. 4 in a first side-view orientation.

FIGS. 4-6 show another heated and cooled steering device 200 for a vehicle according to the present disclosure. The steering device 200 includes a temperature control device 202 that heats and/or cools one or more separate temperature controlled regions 204 provided in areas where of the steering device 200 may be grasped when steering of the vehicle. The temperature control device 202 includes a Peltier element and a thermal conduction element that conducts thermal energy between the peltier element and the temperature controlled regions. In a preferred embodiment, the thermal conduction element includes a flexible ribbon formed of braided strands of a conductive material.

The steering device 200 has a rim or grip piece 210 connected to a central hub 212 by spokes 214. The grip piece 210 includes a rigid support 220, a first cushion layer 222, a second cushion layer 224, and a covering 226 disposed as shown in FIG. 5. The first and second cushion layers 222, 224 are disposed on opposite sides of the temperature control device 202 and cooperate to provide the rim piece 210 with a compliant, pleasant feel when gripped. In various embodiments, the first and second cushion layers 222, 224 are composed of foam materials. The first cushion layer 222 is configured to be more thermally insulating than the second cushion layer 224 and the covering 226 and thereby promote thermal communication between a hand grasping the grip piece 210 and the temperature control device 202. The first cushion layer 222 can have a thermal conductivity less than or equal to a thermal conductivity of the second cushion layer 224, and a thickness greater than or equal to a thickness of the second cushion layer 224.

Figure 10:
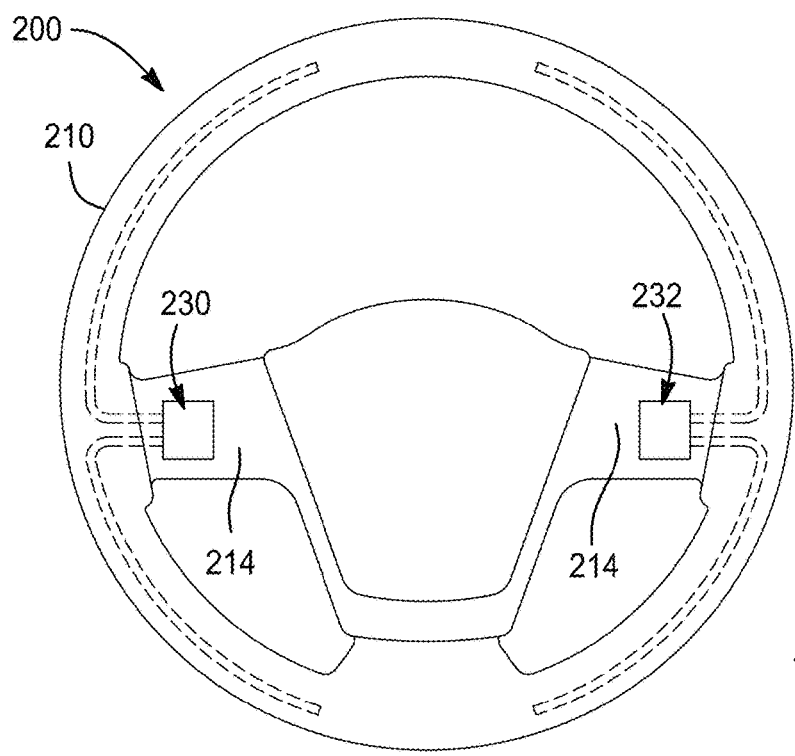
FIG. 10 schematically shows another embodiment, in a perspective pictorial representation, of a steering wheel including another temperature control device.

The temperature control device 202 is operable to selectively heat and/or cool the temperature controlled regions 204 at one or more power levels. The temperature control device 202 includes thermoelectric devices 230, 232 fluidly coupled to a fluid transport device 234 by a forked channel 236. As illustrated by the present embodiment, the thermoelectric devices 230, 232, the fluid transport device 234, and the forked channel 236 can be at least partially located within the central hub 212 where more space is available for these components than in other areas of the steering device 200. In other embodiments, the thermoelectric devices 230, 232 can be located entirely within the grip piece 210 and the spokes 214 as illustrated in FIG. 10. Locating the thermoelectric devices 230, 232 closer to the grip piece 210 can improve an overall heating and cooling effectiveness and efficiency of the steering device 200.

The thermoelectric devices 230, 232 can have identical, or at least substantially similar constructions, and in some embodiments mirrored geometry. Accordingly, thermoelectric device 230 will now be described in more detail with the understanding that the following description applies equally to thermoelectric device 232.

With particular reference to FIG. 6, the thermoelectric device 230 includes a peltier element 240, a first, main side heat exchanger 242, and a second, waste side heat exchanger 244. The peltier element 240 is operably coupled to a controller (not shown) via wiring (not shown). In various embodiments, the controller can be located within the steering device 200 and, more particularly, within a housing provided for the thermoelectric device 230. In other embodiments, the controller can be located remotely with respect to the steering device 200. The wiring can be routed through passages within the steering device 200. In a heating mode of operation, the Peltier element 240 is operable to heat a temperature controlled region 204 by pumping heat from the waste side heat exchanger 244 to the main side heat exchanger 242. In a cooling mode of operation, the Peltier element 240 is operable to cool a temperature controlled region 204 by pumping heat from the main side heat exchanger 242 to the waste side heat exchanger 244.

The main side heat exchanger 242 is configured to conduct heat between the peltier element 240 and the temperature controlled regions 204 of the grip piece 210. Accordingly, the main side heat exchanger 242 includes one or more thermal conduction elements extending between the peltier element 240 and respective temperature controlled regions 204. In various embodiments, the main side heat exchanger 242 includes two thermal conduction elements 250, 252 including flexible ribbons formed of braided strands of a ductile metal material. A thickness and construction of the strands can be selected to provide a desired thermal conductivity and mechanical flexibility, for example for bending along the desired path as well as conforming to a curved shape of the grip piece 210.

The strands can be formed of an alloy of aluminum or copper coated by nickel or other coatings such as tin, lead, zinc, silver, or indium or combinations thereof. The coatings can serve one or more purposes. One purpose can be to provide corrosion resistance against exposure to various substances the grip piece 210 may come in contact with, such as those present in sweat, rain, or from various environments, such salty environments near the ocean. Another purpose can be to inhibit chemical interactions between the materials of the thermal conduction elements 250, 252 and surrounding materials. Yet another purpose can be to promote soldering or other connection of the thermal conduction elements 250, 252 to the Peltier element 240.

The thermal conduction elements 250, 252 can extend together from the pettier element 240 through a respective spoke 214 in contact or close proximity, then away from each other in opposite directions between the cushion layers 222, 224 within respective temperature controlled regions 204. The thermal conduction elements 250, 252 can have a relatively flat shape along the spoke 214, and then transition to a curved shape conforming to the circular shape and cross-section of the grip piece 210 in the temperature controlled regions 204.

The thermal conduction elements 250, 252 are thermo-mechanically coupled to the peltier element 240 via interfaces 254, 256 disposed as shown in FIG. 6. In various embodiments, the interfaces 254, 256 are formed of a heat-conducting adhesive, solder, particularly a lead-free tin solder, or other suitable coupling. The interfaces 254, 256 can be different, for example where the interface 254 is specially configured to couple the thermal conduction element 250 and the peltier element 240 together, and the interface 256 is specially configured to couple the first and second thermal conduction elements 250, 252 together. The interface 254 can be located entirely within a region directly between the thermal conduction element 250 and the peltier element 240. The interface 254 can be similarly located between the thermal conduction element 252 and the peltier element 240, or extend further to couple the thermal conduction elements 250, 252 along a length of the spoke 214 as shown by the dashed line in FIG. 6.

Figure 7:
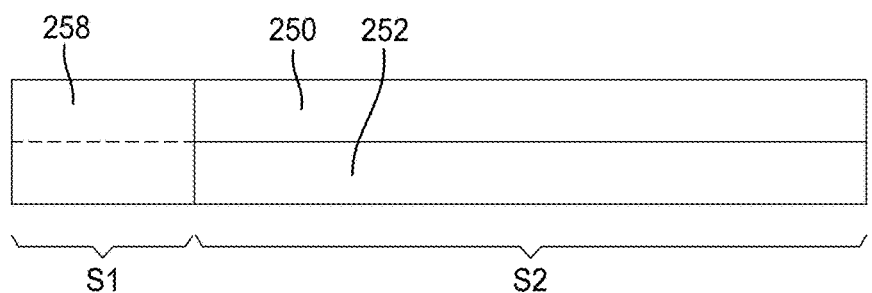
FIG. 7 schematically shows an of another temperature control device in a second side view orientation orthogonal to the first side-view orientation of FIG. 6.

In various embodiments, the thermal conduction elements 250, 252 can extend side-by-side in a common plane and can be coupled to the peltier element 240 by a common thermomechanical interface 258 as illustrated in FIG. 7.

Figure 8:
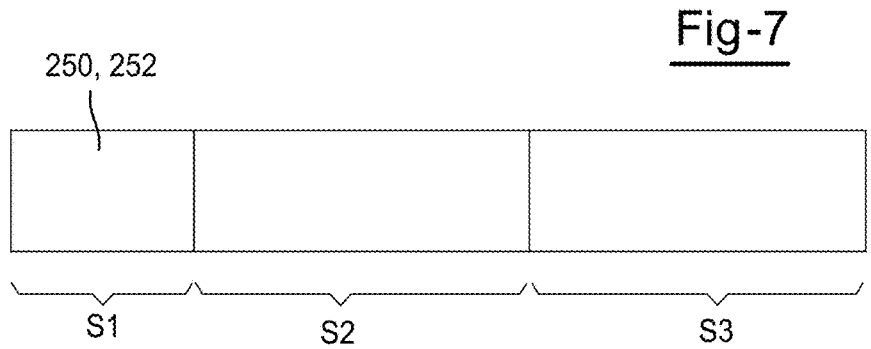
FIG. 8 schematically shows another embodiment of a temperature control device in a side view orientation.
Figure 9:
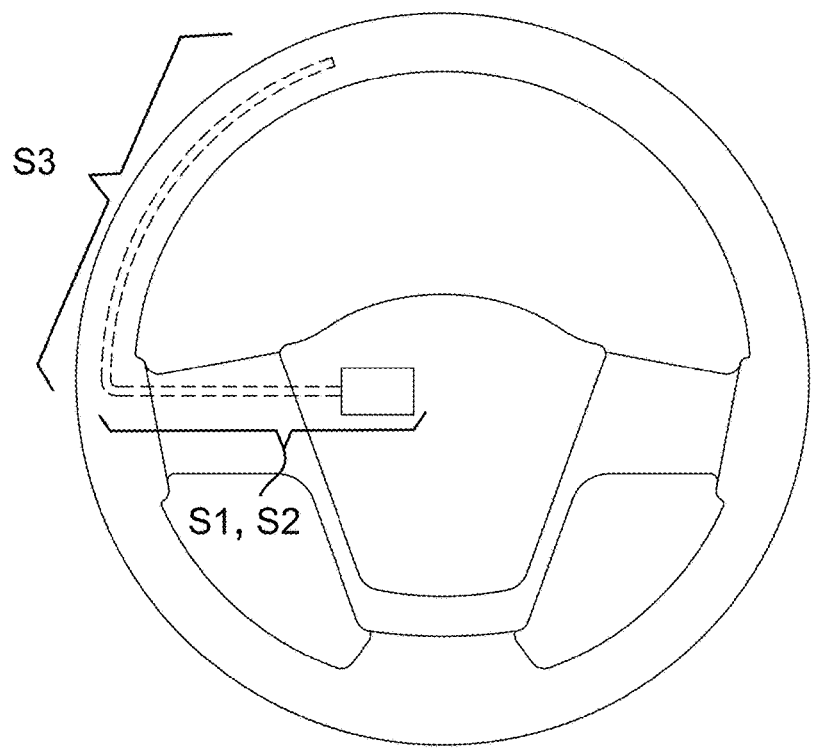
FIG. 9 schematically shows, in a perspective pictorial representation, a steering wheel including the temperature control device of FIG. 8.

In other embodiments, the thermal conduction elements 250, 252 can include rigid sections S1, S2 and a flexible section S3 as illustrated in FIGS. 8-9. The rigid sections S1, S2 can extend along a length of the spokes 214 and can be constructed of a heat pipe similar to those described above for the heat conducting strands 44. The flexible section S3 can extend along a length of the grip piece 210 and can be constructed of a flexible ribbon formed of braided strands as discussed above.

The thermal conduction element 250, 252 are preferably thermally insulated from surrounding regions outside of the temperature controlled regions 204. In various embodiments, a first insulator formed of a sheath 260 can insulate the thermal conduction elements 250, 252 along a first length L1 as shown in FIG. 6. A second insulator 262 formed by a surrounding support structure of the steering device 200 can insulate the thermal conduction elements 250, 252 along other lengths L2, L3. The first cushion layer 222 can insulate the thermal conduction elements 250, 252 on one side along a length L4 within the temperature control regions 204 as discussed above.

The waste side heat exchanger 244 is configured to exchange heat between a waste side of the peltier element 240 and air forced past the waste side heat exchanger 244 through the forked channel 236 by the fluid transport device 234. In various embodiments, the waste side heat exchanger 244 includes corrugated fins thermally coupled to the waste side by a thermal adhesive, solder, or other coupling.

The fluid transport device 234 is configured to move (i.e. force or draw) air through the forked channel 236 and the waste side heat exchanger 244. In various embodiments, the fluid transport device 234 draws in through inlet openings (not shown) and out through outlet openings (not shown) provided in the steering device 200. The inlet openings can be located at any convenient location on the steering device 200 for drawing air in. The outlet openings are preferably located at a convenient location for forcing air out and away from the occupant. The inlet and outlet openings are preferably spaced apart with respect to each other to avoid warm air from the outlet openings from being drawn in through the inlet openings. In one preferred embodiment, the inlet and outlet openings are spaced apart approximately 100 millimeters or more.

In alternate embodiments, the fluid transport device 234 can include a dual outlet blower and separate channels fluidly coupling the outlets with respective waste side heat exchangers 244 of the thermoelectric devices 230, 232.

The forked channel 236 is configured to channel air through the steering device 200 between the fluid transport device 234 and the thermoelectric devices 230, 232. In various embodiments, the forked channel 236 can be formed by ducting connecting the fluid transport device 234 and the thermoelectric devices in an assembly. In other embodiments, surrounding support structure of the steering device 200 can form the forked channel 236.

Figure 11:
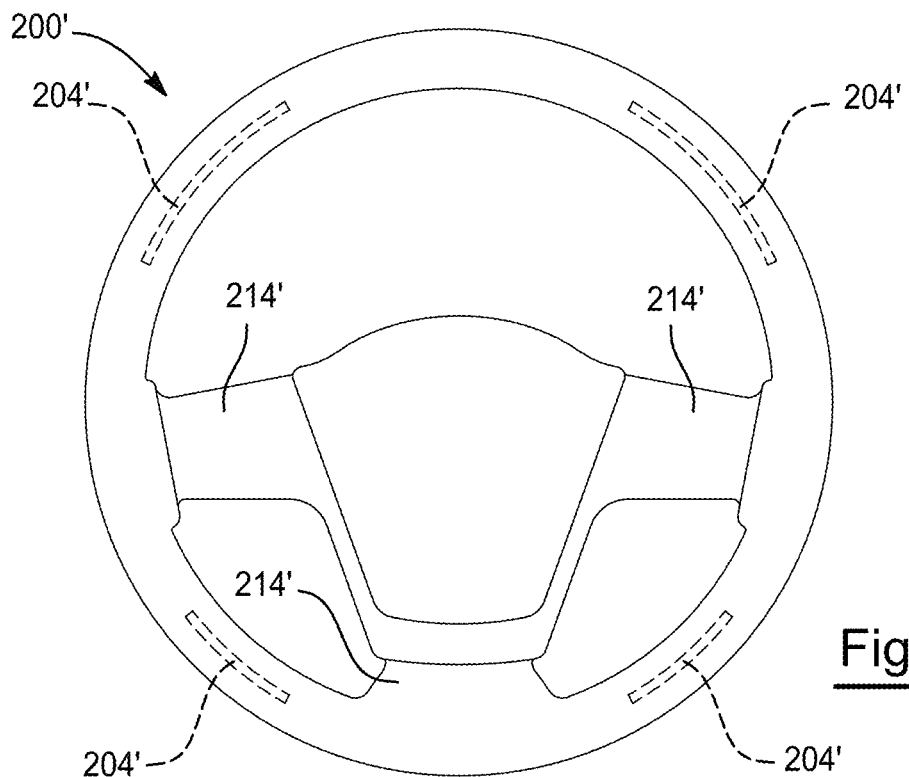
FIGS. 11-12 schematically show embodiments, in perspective pictorial representations, of temperature controlled regions of other steering wheels.
Figure 12:
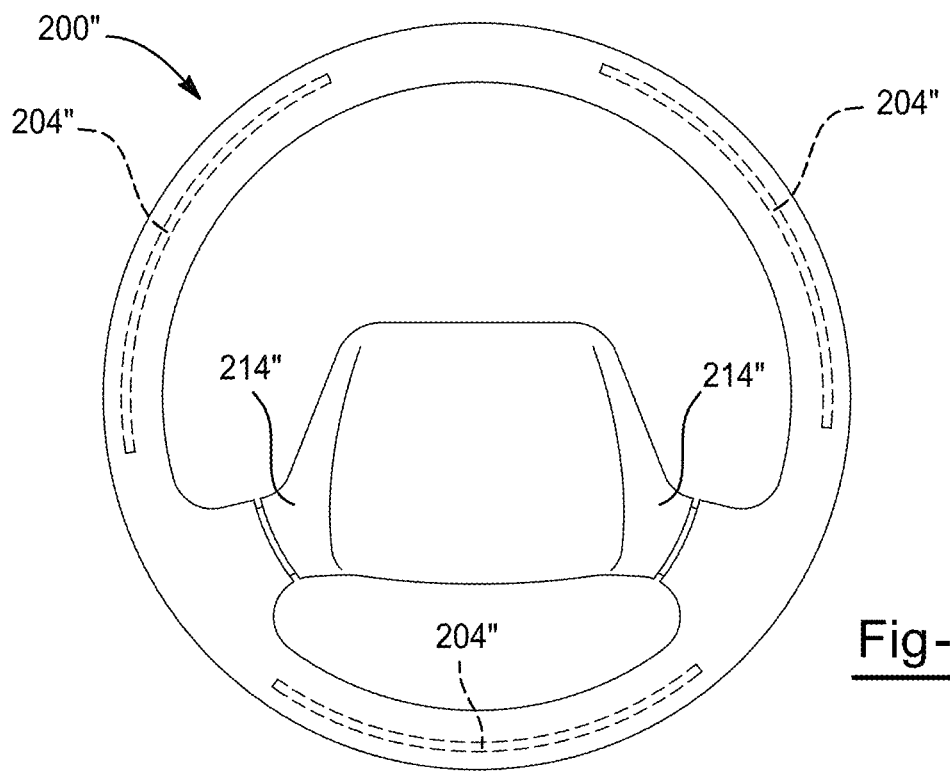

With particular reference now to FIGS. 11-12, steering devices 200', 200'' illustrate various locations for temperature controlled regions 204', 204''. In FIG. 11, three spokes 214' are located around nine o-clock, three o-clock, and six o-clock positions. Four temperature controlled regions 204' are located adjacent the spokes 214'. In FIG. 12, two spokes 214'' are located around eight o-clock and 4 o-clock positions. Three temperature controlled regions 204'' are located adjacent the spokes 214''.

Figure 13:
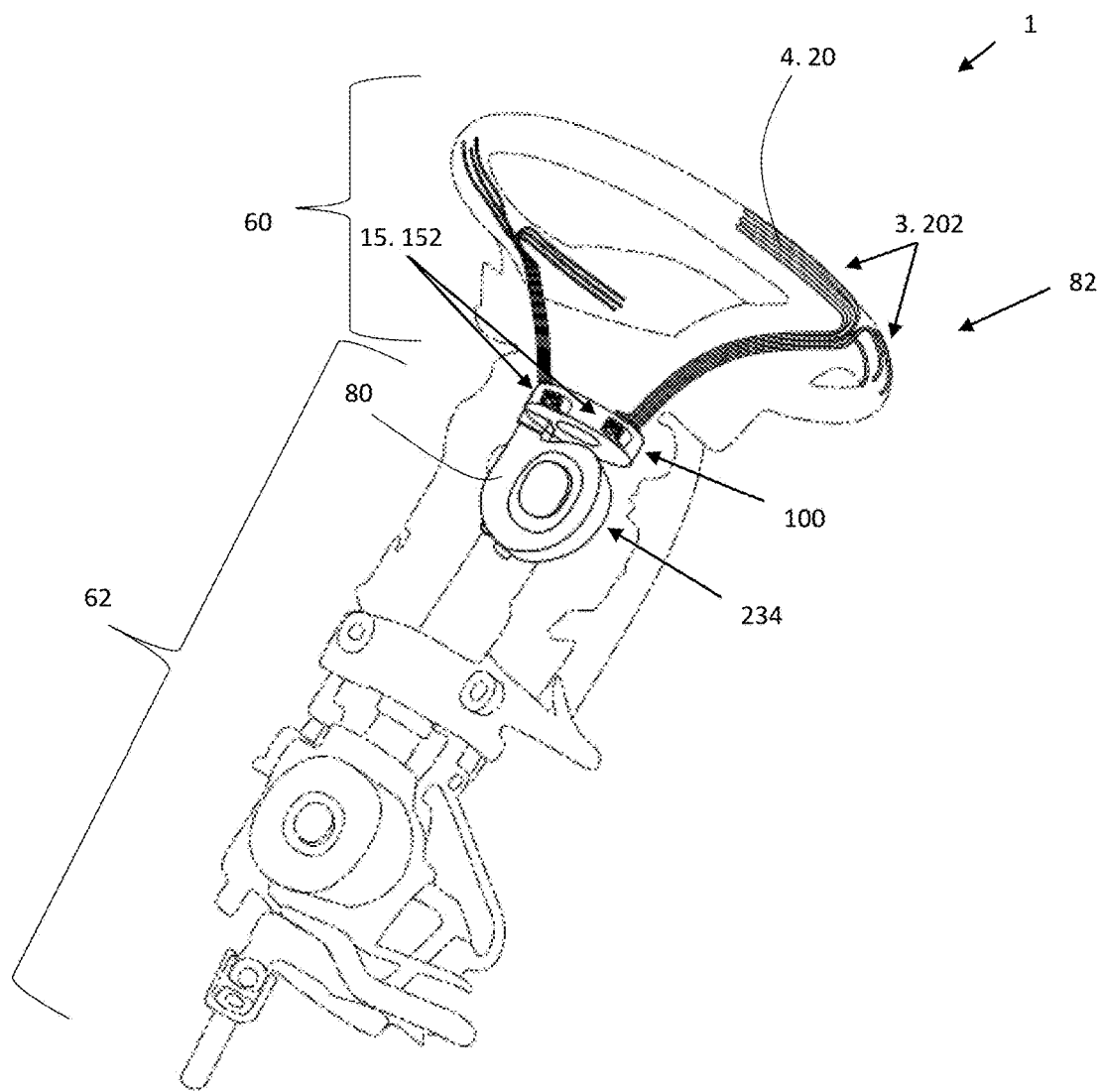
FIG. 13 illustrates a steering device including a conditioning system.

FIG. 13 illustrates a steering device 1 including a conditioning system 82 incorporated therein. The steering device 1 includes a movable part 60 and a static part 62. As shown the movable part 60 is a steering wheel and the steering wheel includes a temperature control device 3, 202 that includes a plurality of conducting devices 4 that extends partially around the steering wheel. The conducting devices 4 as shown are gas tight tubes 20 that retain a fluid therein for moving heat from the steering wheel to the connecting device 100. The connecting device 100 includes a thermal electric device 15 and heat exchanger 152 that removes energy (e.g. heat and/or cool) from the gas tight tubes 20 so that the gas tight tubes 20 provide a desired thermal energy (e.g., heat and/or cool) to the steering wheel. The connecting device 100 is in communication with a fluid transport device 234, which as shown is a blower 80. The blower 80 is located within the static part 62 and is free of movement, but provides fluid into the connecting device 100, which has a portion that is movable.

Figure 14:
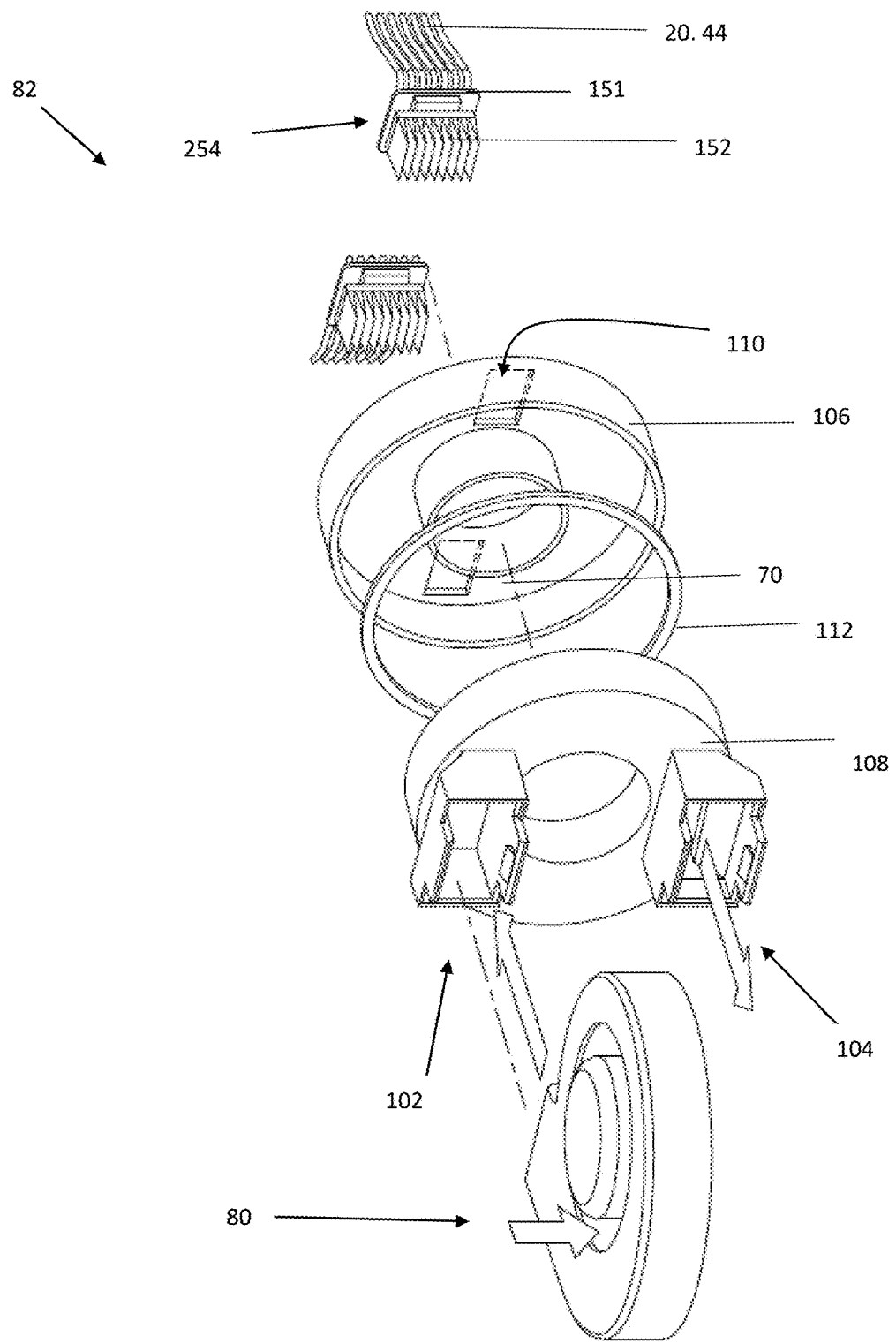
FIG. 14 is an exploded view of a conditioning system.

FIG. 14 is an exploded view of the conditioning system 82 shown in FIG. 13. The conditioning system 82 includes a blower 80 that moves air into the inlet 102 of the connecting device 100. As air is moved into the inlet 102 air is wasted and passes out of the outlet 104 of the connecting device 100. The connecting device 100 includes a movable component 106 and a static component 108 and a seal 112 located therebetween that allows the static component 108 and the movable component 106 to move relative to each other while maintaining a sealed connection. The static component 108 is connected to the blower 80 and the movable component 106 includes conducting slots 110 that allow the heat conducting strands 44 to extend into the connecting device 100 and connect to pettier elements 151 located within the connecting device 100. The heat conducting strands 44 as illustrated are gas tight tubes 20. The conducting strands 44 are connected to the peltier element 151 at an interface 254. A heat exchanger 152 extends from the peltier element 151 so that thermal energy may be removed from the conducting strands 44 by air moving through the connecting device 100. The thermal energy removed from the heat exchanger 152 are removed out through the outlet 104

Figure 15:
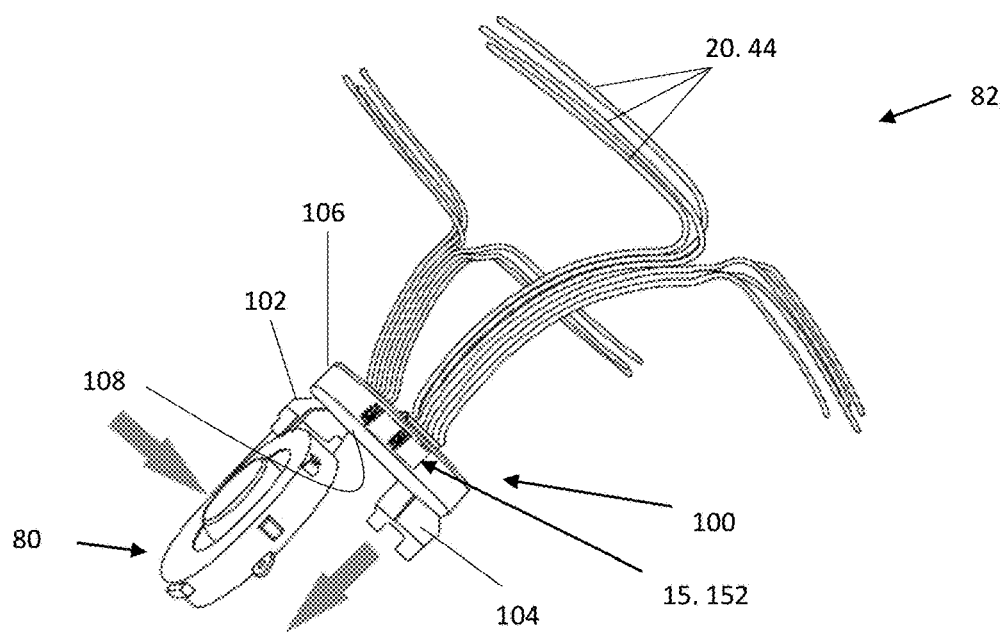
FIG. 15 illustrates a conditioning system and a connecting device.

FIG. 15 illustrates a conditioning system 82 having a blower 80 connected to the connecting device 100 so that the blower 80 is blowing air into an inlet 102 of the connecting device 100 so that the air moves past the thermal electric device 15 and heat exchanger 152 and unwanted thermal energy is removed out the outlet 104. The connecting device 100 includes a static component 108 and a movable component 106. The static component 108 is connected to the blower 80 and the static component 108 does not move relative to the blower 80. A movable component 106 is in communication with the static component 108 and the movable component 106 includes slots (not shown) that the heat conducting strands 44 extend through so that the heat conducting strands 44 are in communication with the thermal electric device 15. The movable component 106 moves relative to the static component 108, but moves with the heat conducting strands 44 so that the movable component 106 and heat conducting strands 44 are static relative to each other. The heat conducting strands 44 are gas tight tubes 20 that as shown are heat pipes.

Figure 16:
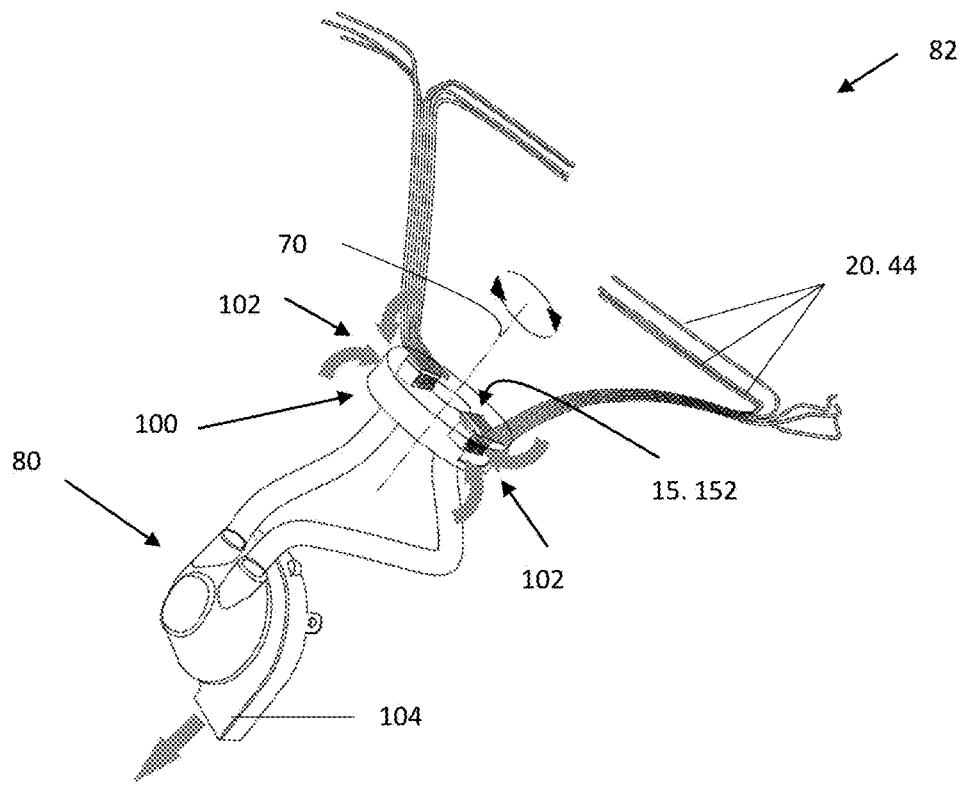
FIG. 16 illustrates a conditioning system and a connecting device.

FIG. 16 illustrates a conditioning system 82 where the blower 80 pulls air from the connecting device 100 so that air enters the connecting device 100 at an inlet 102 and exits the connecting device 100 at an outlet 104 located at the blower 80. As the air enters the inlet 102 air is pulled past a heat exchanger 152 that is connected to a thermal electric device 15 and waste thermal energy is removed out of the outlet 104. The heat conducting strands 44 are connected to the thermal electric device 15 so that thermal energy is passed to the heat conducting strands 44, which are shown are gas tight tubes 20. The gas tight tubes 20 are located within a steering wheel (not shown) and the gas tight tubes 20 rotate about the steering wheel pivot axis 70 with the steering wheel.

Figure 17:
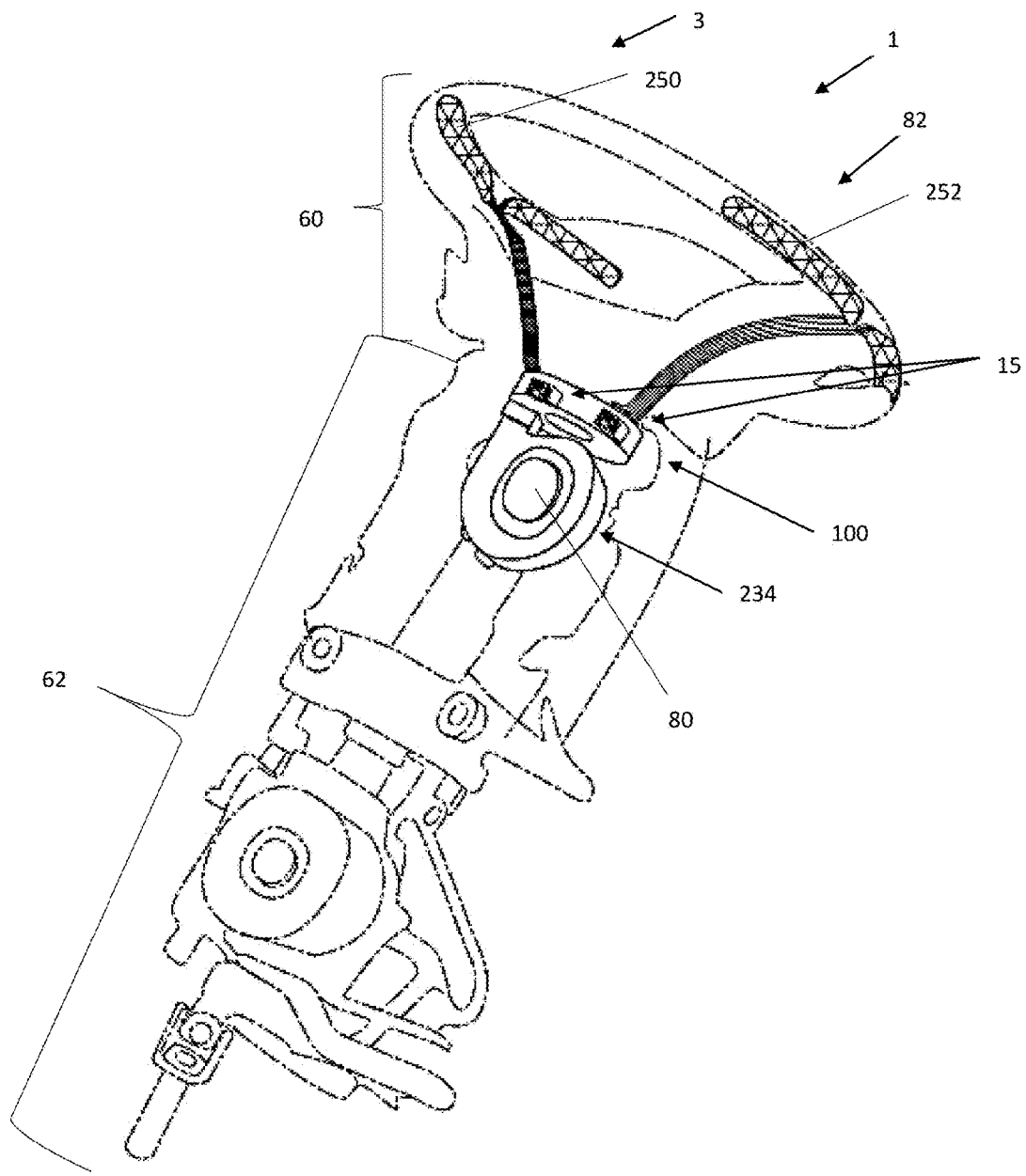
FIG. 17 illustrates a steering device including a conditioning system.

FIG. 17 illustrates a steering device 1 having a movable part 60 and a static part 62. A conditioning system 82 extends between and is located partially in the movable part 60 and the static part 62. A connecting device 100 is located in the static part 3 at the edge of the static part 62 and the movable part 60 so that the connecting device 100 partially moves with the steering wheel when moved and partially remains static. Thermal conduction elements 250, 252 extend from the connecting part 100 into the steering wheel so that thermal energy is provided to the steering wheel at desired locations. The thermal conduction elements 250, 252 are in communication with a thermal electric device 15 that provides thermal energy to the thermal conduction elements 250, 252 to provide conditioning to the steering wheel. A fluid transfer device 234, which is shown as a blower 80 that removes waste thermal energy from connecting device 100 and thermal electric device 15.

Figure 18:
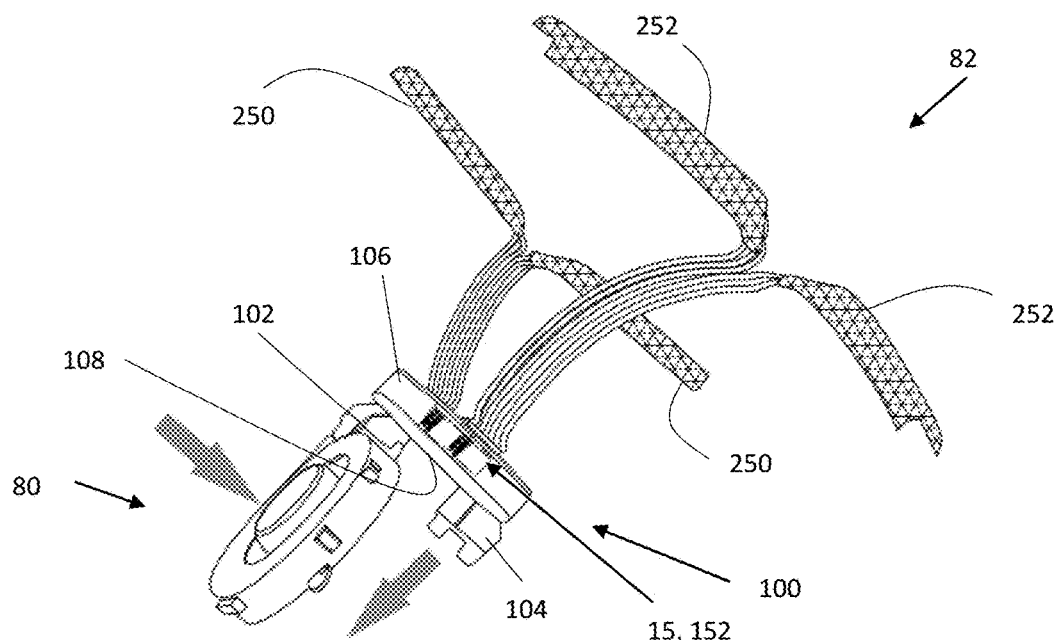
FIG. 18 illustrates a conditioning system and a connecting device.

FIG. 18 illustrates a conditioning system 82 including a temperature control device 3 and a connecting device 100. The blower 80 of the temperature control device 3 is connected to the connecting device 100 so that the blower 80 is blowing air into an inlet 102 of the connecting device 100 where the air moves past the thermal electric device 15 and heat exchanger 152 and unwanted thermal energy is removed out the outlet 104. The connecting device 100 includes a static component 108 and a movable component 106. The static component 108 is connected to the blower 80 and the static component 108 does not move relative to the blower 80. A movable component 106 is in communication with the static component 108 and the movable component 106 includes slots (not shown) that the thermal conducting elements 250, 252 extend through so that the thermal conducting elements 250, 252 are in communication with the thermal electric device 15. The movable component 106 moves relative to the static component 108, but moves with the thermal conducting elements 250, 252 so that the movable component 106 and thermal conducting elements 250, 252 are static relative to each other. The thermal conducting elements 250, 252 are shown are braided strands.

Figure 19:
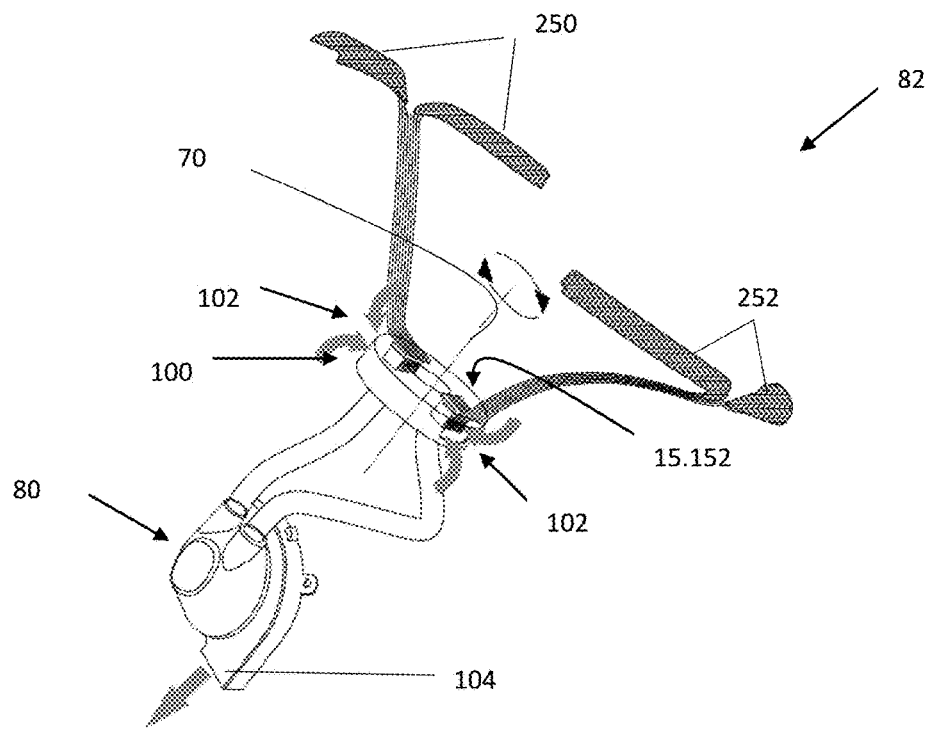
FIG. 19 illustrates a conditioning system and a connecting device.

FIG. 19 illustrates a conditioning system 82 where the blower 80 pulls air from the connecting device 100 so that air enters the connecting device 100 at an inlet 102 and exits the connecting device 100 at an outlet 104 located at the blower 80. As the air enters the inlet 102 air is pulled past a heat exchanger 152 that is connected to a thermal electric device 15 and waste thermal energy is removed out of the outlet 104. The thermal conducting elements 250, 252 are connected to the thermal electric device 15 so that thermal energy is passed to the thermal conducting elements 250, 252, which are shown are braided strands. The thermal conducting elements 250, 252 are located within a steering wheel (not shown) and the thermal conducting elements 250, 252 rotate about the steering wheel pivot axis 70 with the steering wheel.

The invention claimed is:

1. A temperature control device for a steering device including:
   a. at least one decorative covering that forms at least a part of an outer surface of the steering device; and
   b. a temperature conducting device with a heating mode and a cooling mode including at least one heat pipe;
      wherein the at least one heat pipe is in communication with at least one heat-supporting conductor, the at least one heat-supporting conductor surrounds and holds the at least one heat pipe within a recess of the steering device;
      wherein the at least one heat-supporting conductor is at least one bridging piece, the at least one bridging piece extending from inside the steering device to the outer surface of the steering device, the at least one bridging piece and the at least one decorative covering forming the outer surface of the steering device; and
      wherein the at least one heat-supporting conductor transports thermal energy along the at least one decorative covering.

2. The temperature control device according to claim 1, wherein the at least one heat-supporting conductor is metallic.

3. The temperature control device according to claim 1, wherein the at least one decorative covering, the at least one bridging piece, or both include a plurality of perforations.

4. The temperature control device according to claim 3, wherein the perforations are filled with a heat conductive material.

5. The temperature control device according to claim 1, wherein the steering device includes a hard support surrounded by a cushion, the recess is disposed around the circumference of the steering device within the cushion and is configured to accept the at least one heat-supporting conductor holding the at least one heat pipe.

6. The temperature control device according to claim 5, wherein the at least one decorative covering includes a first oblong hole and a second oblong hole located around the circumference of the steering device on a first side and a second side of the recess, respectively; and
   wherein the first oblong hole and the second oblong hole are engaged by the at least one bridging component, the at least one bridging component covering the first oblong hole and the second oblong hole of the decorative covering.

7. The temperature control device according to claim 6, wherein the at least one bridging piece is a disk-shaped component.

8. The temperature control device according to claim 6, wherein the at least one bridging piece is a rail-shaped component.

9. The temperature control device according to claim 1, wherein the decorative covering includes a heat transport component disposed on an underside of the decorative covering away from a user.

10. The temperature control device according to claim 9, wherein the heat transport component is elastic, flexible, and tear resistant.

11. The temperature control device according to claim 10, wherein the heat transport component is composed of a material that is shapeable before it is applied to the decorative covering but then becomes solid after the material is applied to the decorative covering.

12. The temperature control device according to claim 11, wherein the heat transport component is made of silicone rubber.

13. The temperature control device according to claim 1, wherein the temperature conducting device includes at least one thermoelectric device in communication with the at least one heat pipe.

14. The temperature control device according to claim 13, wherein the temperature conducting device is fluidly connected at least one fluid transport apparatus, the fluid transport apparatus uses a fluid stream to conduct heat created by the at least one thermoelectric device out of the steering device and away from the steering device and a user.

15. The temperature control device according to claim 14, wherein the fluid transport apparatus is a fan, the fan is fluidly connected to at least one heat exchanger of the at least one thermoelectric device.

16. The temperature control device according to claim 1, wherein the at least one heat pipe is connected to the at least one heat-supporting conductor by heat-conducting adhesive.

17. The temperature control device according to claim 1, wherein the at least one heat pipe is connected to the at least one heat-supporting conductor by solder.

18. The temperature control device according to claim 1, wherein the at least one heat-supporting conductor engages the at least one heat pipe in a snap-fit engagement.

* * * * *